United States Patent
Kawachi

(10) Patent No.: US 8,416,219 B2
(45) Date of Patent: Apr. 9, 2013

(54) OPERATING DEVICE AND OPERATING SYSTEM

(75) Inventor: Kazuhiro Kawachi, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/677,052

(22) PCT Filed: Sep. 26, 2008

(86) PCT No.: PCT/IB2008/002899
§ 371 (c)(1),
(2), (4) Date: Mar. 8, 2010

(87) PCT Pub. No.: WO2009/040663
PCT Pub. Date: Apr. 2, 2009

(65) Prior Publication Data
US 2010/0181171 A1    Jul. 22, 2010

(30) Foreign Application Priority Data

Sep. 26, 2007    (JP) ................... 2007-250258

(51) Int. Cl.
*G06F 3/033*    (2006.01)
*G09G 5/00*    (2006.01)

(52) U.S. Cl.
USPC ............... 345/184; 345/156; 345/173; 200/4; 200/5 R; 200/504; 200/61.54

(58) Field of Classification Search .......... 345/156–168, 345/173–184; 200/4, 5 R, 61.28, 61.44, 200/61.54, 504, 505, 518
See application file for complete search history.

(56) References Cited

U.S. PATENT DOCUMENTS

| 5,973,275 | A | 10/1999 | Mozer et al. | |
|---|---|---|---|---|
| 7,040,823 | B2* | 5/2006 | Silverbrook | 400/419 |
| 2004/0233159 | A1* | 11/2004 | Badarneh | 345/156 |
| 2006/0092130 | A1 | 5/2006 | Choquet et al. | |
| 2006/0241818 | A1 | 10/2006 | Kumon | |

FOREIGN PATENT DOCUMENTS

| DE | 43 01 292 | 7/1994 |
|---|---|---|
| DE | 195 28 641 | 2/1997 |
| DE | 10 2005 049 517 | 6/2006 |
| EP | 1 762 421 | 3/2007 |
| JP | 2003 162943 | 6/2003 |
| JP | 2004 26050 | 1/2004 |
| JP | 2005 132341 | 5/2005 |
| JP | 2006 298241 | 11/2006 |

* cited by examiner

*Primary Examiner* — Lun-Yi Lao
*Assistant Examiner* — Insa Sadio
(74) *Attorney, Agent, or Firm* — Oblon, Spivak, McClelland, Maier & Neustadt, L.L.P.

(57) ABSTRACT

An annular switch (SW) for detecting contact is provided on an operating lever (R6), and when the annular switch detects contact, an operation screen (104) pre-associated with the annular switch (SW) is displayed on a display (104) screen of a display unit (104). Operation mode images representing functions included in an operation subject are displayed on the display screen of the display unit in association with a rotation direction and a sliding direction of the annular switch (SW). A function is selected by rotating and sliding the annular switch, and the selected function is executed when the annular switch (SW) ceases to detect contact.

31 Claims, 25 Drawing Sheets

FIG. 3

|  | VALUE | OPERATION MODE |
|---|---|---|
| FOG | 0 | OFF |
|  | 1 | FRONT FOG LIGHT On |
|  | 2 | REAR FOG LIGHT On |
| LIGHT | 0 | OFF |
|  | 1 | AUTO |
|  | 2 | SMALL |
|  | 3 | HIGH |
| FRONT WIPER | −1 | MIST |
|  | 0 | OFF |
|  | 1 | AUTO |
|  | 2 | LOW |
|  | 3 | HIGH |
| REAR WIPER | 0 | OFF |
|  | 1 | INT |
|  | 2 | NORMAL |
| WIPER SPEED | 1 | 1 |
|  | 2 | 2 |
|  | 3 | 3 |
|  | 4 | 4 |
|  | 5 | 5 |
| REAR WIPER SPEED | 1 | 1 |
|  | 2 | 2 |
|  | 3 | 3 |
|  | 4 | 4 |
|  | 5 | 5 |

FIG. 23

| | VALUE | OPERATION MODE |
|---|---|---|
| FOG | 0 | OFF |
| | 1 | FRONT FOG LIGHT On |
| | 2 | REAR FOG LIGHT On |
| LIGHT | 0 | OFF |
| | 1 | AUTO |
| | 2 | SMALL |
| | 3 | HIGH |
| FRONT WIPER | −1 | MIST |
| | 0 | OFF |
| | 1 | AUTO1 |
| | 2 | AUTO2 |
| | 3 | AUTO3 |
| | 4 | AUTO4 |
| | 5 | AUTO5 |
| | 6 | LOW |
| | 7 | HIGH |
| REAR WIPER | 0 | OFF |
| | 1 | INT1 |
| | 2 | INT2 |
| | 3 | INT3 |
| | 4 | INT4 |
| | 5 | INT5 |
| | 6 | ON |

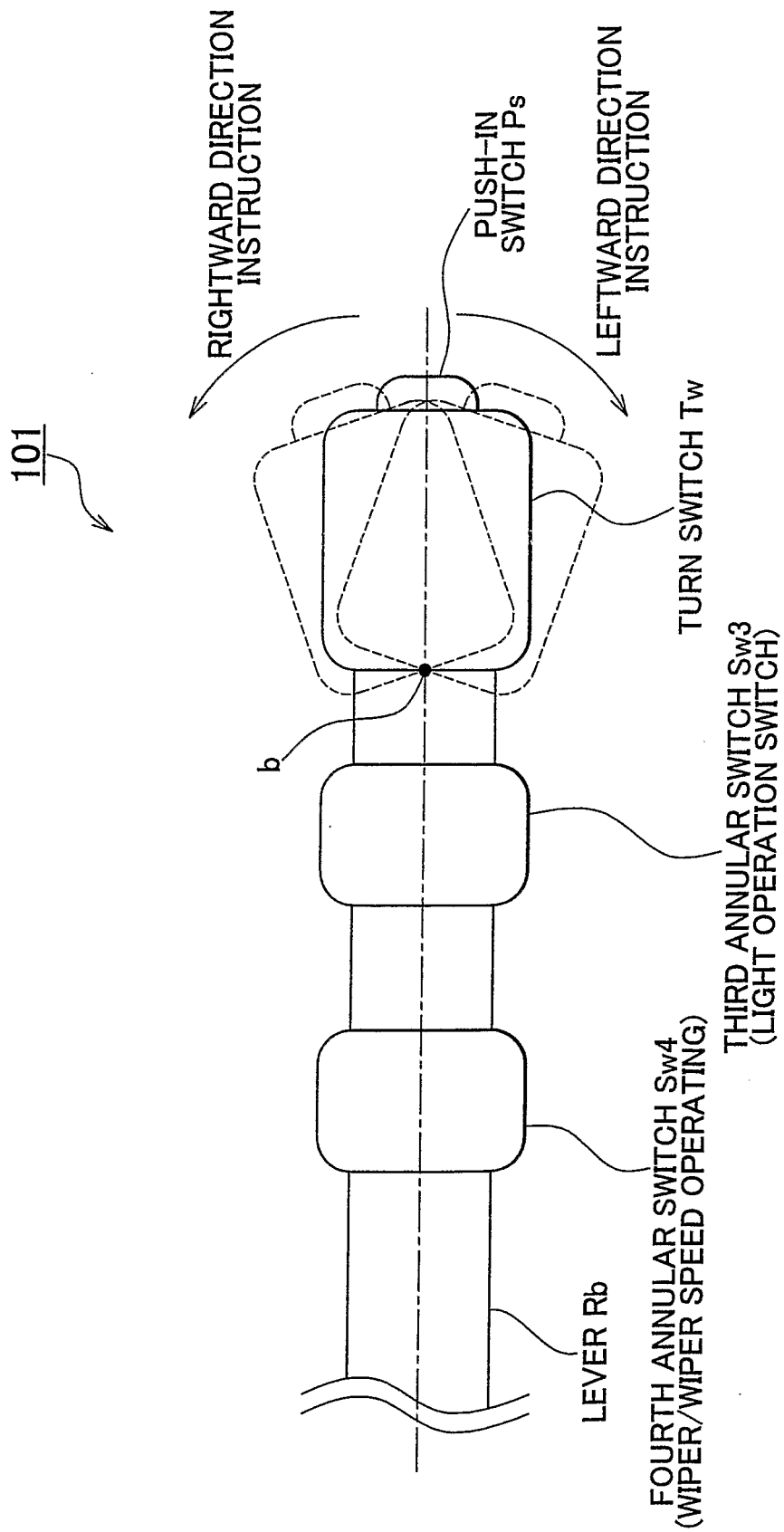

OPERATING DEVICE AND OPERATING SYSTEM

BACKGROUND OF THE INVENTION

1. Field of the Invention

The present invention relates to an operating device and an operating system, and more particularly to an operating device and an operating system for operating an in-vehicle device installed in a moving body such as an automobile.

2. Description of the Related Art

Various operating devices have been proposed with the aim of providing an in-vehicle device installed in a moving body such as an automobile with an improved operating environment. A vehicle lever switch structure described in Japanese Patent Application Publication No. 2003-162943 (JP-A-2003-162943) may be cited as an example of this type of operating device. This vehicle lever switch is a lever switch for operating an in-vehicle device such as a turn signal, lights, and wipers, and functions as a turn signal switch, a passing switch, a main dimmer switch, a wiper/washer switch, and so on. When a button provided on an end portion of the lever switch is pushed, a lamp provided inside the lever switch emits light, thereby illuminating a turn signal switch display unit, a lighting switch display unit, and a wiper switch display unit respectively provided on the front surface of the lever switch. Thus, a driver who is not accustomed to operating the lever switch can clearly see the respective display units illuminated by the lamp on the lever front surface even when operating the lever switch at night.

Further, a technique described in Japanese Patent Application Publication No. 2006-298241 (JP-A-2006-298241) may be cited as another type of operating device for providing an in-vehicle device with an improved operating environment. In JP-A-2006-298241, in-vehicle device switches are provided on spoke parts of a steering wheel, and a driver gripping the steering wheel operates various in-vehicle devices by operating the switches while viewing a display screen. Thus, the driver can operate the in-vehicle devices using his/her thumbs, without taking his/her hands off the steering wheel during travel. In this technique, when the driver touches a steering switch provided on the steering wheel while gripping the steering wheel with a preferred grip, a display image representing a steering switch operation guide is displayed on a Head Up Display (HUD) provided on a windshield of the vehicle. In the operation guide displayed on the HUD in this technique, a diagrammed pattern of buttons and the arrangement thereof within a frame emulate the actual pattern and arrangement of the actual steering switches. A button on the display image corresponding to the steering switch touched by the driver is displayed in an inverted state. Hence, with the technique described in JP-A-2006-298241, when the driver operates a steering switch s/he can comprehend the type and position of the switch touched by him/her intuitively and visually, without directly checking his/her hands.

However, a lever switch such as that described in JP-A-2003-162943 is typically disposed on a steering column located to the rear of the steering wheel relative to the driver. Therefore, even when the front surface of the lever switch is illuminated by the lamp, visual confirmation of the lever switch is obstructed by the steering wheel. In other words, with the technique described in JP-A-2003-162943, it is difficult to distinguish clearly between functions such as the turn signal switch, the passing switch, the main dimmer switch, and the wiper/washer switch, and therefore to operate these switches correctly, even when the display units on the front surface of the lever switch are illuminated by the lamp provided in the interior of the lever switch.

Furthermore, recent years have witnessed increases in the number of functions provided in in-vehicle devices. With the technique described in JP-A-2006-298241, steering switches must be provided for each of the many functions of the in-vehicle devices so that the driver can operate the many functions of the in-vehicle devices that need to be performed during vehicle travel. However, there is not enough space on the spoke parts of the steering wheel to provide all of the steering switches. In other words, the technique described in JP-A-2006-298241 is not sufficient to operate the respective multi-function in-vehicle devices.

SUMMARY OF THE INVENTION

The present invention provides an operating device and an operating system with which a driver can operate a switch correctly and make a selection from a large number of functions easily.

A first aspect of the present invention relates to an operating device including: an annular switch attached to an outer peripheral surface of a substantially rod-shaped operating lever so as to be capable of performing a reciprocating motion in a certain fixed direction the outer peripheral surface of the operating lever; contact/non-contact detecting means for detecting contact and non-contact states in relation to the annular switch; display means for displaying a plurality of functions of a specific operation subject pre-associated with the annular switch in a single row extending in a direction corresponding to the direction of the reciprocating motion of the annular switch when the contact/non-contact detecting means detects the contact state in relation to the annular switch; function selecting means for selecting one function from the plurality of functions displayed in the single row by the display means in accordance with a position of the reciprocating motion of the annular switch in the certain fixed direction when the contact/non-contact detecting means detects the contact state in relation to the annular switch; and execution instructing means for issuing an instruction to the corresponding operation subject to execute the function selected by the function selecting means at a point in time when the contact/non-contact detecting means detects that the annular switch has shifted from the contact state to the non-contact state.

The annular switch may be made capable of rotating in a circumferential direction of the operating lever.

The annular switch may be made capable of sliding in a lengthwise direction of the operating lever.

The operating device may further include function highlighting means for causing the display means to highlight the function selected by the function selecting means.

A second aspect of the present invention relates to an operating device including: an annular switch attached to an outer peripheral surface of a substantially rod-shaped operating lever so as to be capable of rotating in a circumferential direction of the operating lever and sliding in a lengthwise direction of the operating lever; contact/non-contact detecting means for detecting contact and non-contact states in relation to the annular switch; display means for displaying a plurality of functions of an operation subject pre-associated with the annular switch in a single row extending in a direction corresponding to the rotation direction when the contact/non-contact detecting means detects the contact state in relation to the annular switch; display switching means for selectively switching a function group of the operation subject displayed by the display means to a function group of an operation subject corresponding to a sliding position of the annular switch when the contact/non-contact detecting means detects the contact state in relation to the annular switch; function selecting means for selecting one function from the plurality of functions displayed in the single row by the display means in accordance with a rotation position of the annular switch when the contact/non-contact detecting means detects the contact state in relation to the annular switch; and execution instructing means for issuing an instruction to the operation subject to execute the function selected by the function selecting means at a point in time when the contact/non-contact detecting means shifts from the contact state to the non-contact state.

A plurality of operation subjects may be associated with the annular switch in accordance with the sliding position thereof, the display means may display the function groups of all of the operation subjects associated with the annular switch at once in a plurality of rows, and the display switching means may switch a display state of the display means such that the function group of an operation subject corresponding to the sliding position of the annular switch is highlighted.

A plurality of operation subjects may be associated with the annular switch in accordance with the sliding position thereof, and the display means may switch a display state such that only the function group of an operation subject corresponding to the sliding position of the annular switch is displayed.

The operating device may further include function highlighting means for causing the display means to highlight the function selected by the function selecting means.

A third aspect of the present invention relates to an operating device including: an annular switch attached to an outer peripheral surface of a substantially rod-shaped operating lever so as to be capable of rotating in a circumferential direction of the operating lever and sliding in a lengthwise direction of the operating lever; contact/non-contact detecting means for detecting contact and non-contact states in relation to the annular switch; display means for displaying a plurality of functions of an operation subject pre-associated with the annular switch in a single row extending in a direction corresponding to the sliding direction when the contact/non-contact detecting means detects the contact state in relation to the annular switch; display switching means for selectively switching a function group of the operation subject displayed by the display means to a function group of an operation subject corresponding to a rotation position of the annular switch when the contact/non-contact detecting means detects the contact state in relation to the annular switch; function selecting means for selecting one function from the plurality of functions displayed in the single row by the display means in accordance with a sliding position of the annular switch when the contact/non-contact detecting means detects the contact state in relation to the annular switch; and execution instructing means for issuing an instruction to the corresponding operation subject to execute the function selected by the function selecting means at a point in time when the contact/non-contact detecting means shifts from the contact state to the non-contact state.

A plurality of operation subjects may be associated with the annular switch in accordance with the rotation position thereof, the display means may display the function groups of all of the operation subjects associated with the annular switch at once in a plurality of rows, and the display switching means may switch a display state such that the function group of an operation subject corresponding to the rotation position of the annular switch is highlighted.

A plurality of operation subjects may be associated with the annular switch in accordance with the rotation position thereof, and the display means may switch a display state such that only the function group of an operation subject corresponding to the rotation position of the annular switch is displayed by the display means.

The operating device may further include function highlighting means for causing the display means to highlight the function selected by the function selecting means.

The operating device may further include guidance image display means for displaying an image for providing guidance relating to an operation state of the annular switch.

The operating device may further include a plurality of annular switches, and a different operation subject may be associated with each of the annular switches.

The operating device may be installed in a vehicle.

A fourth aspect of the present invention relates to an operating system including a plurality of operation subjects and an operating lever. The operating system includes a switch provided on an outer peripheral surface of the operating lever so as to be capable of performing a first direction movement and a second direction movement over the operating lever, and a display device for displaying a first image representing the plurality of operation subjects and a second image representing a function group of the plurality of operation subjects. One of the first image and the second image is allocated to the first direction movement over the operating lever, and the other of the first image and the second image is allocated to the second direction movement over the operating lever.

According to the present invention, an operating device which enables a driver to operate a switch of an in-vehicle device that the driver wishes to operate without error, whereby a large number of functions can be performed easily.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 3 is a view showing an example of a storage table stored in a storage unit;

FIG. 23 is a view showing an example of a storage table according to the second modified example of the embodiment;

FIG. 25 is a view showing another schematic constitution of the operating unit.

DETAILED DESCRIPTION OF EMBODIMENTS

Figure 1:
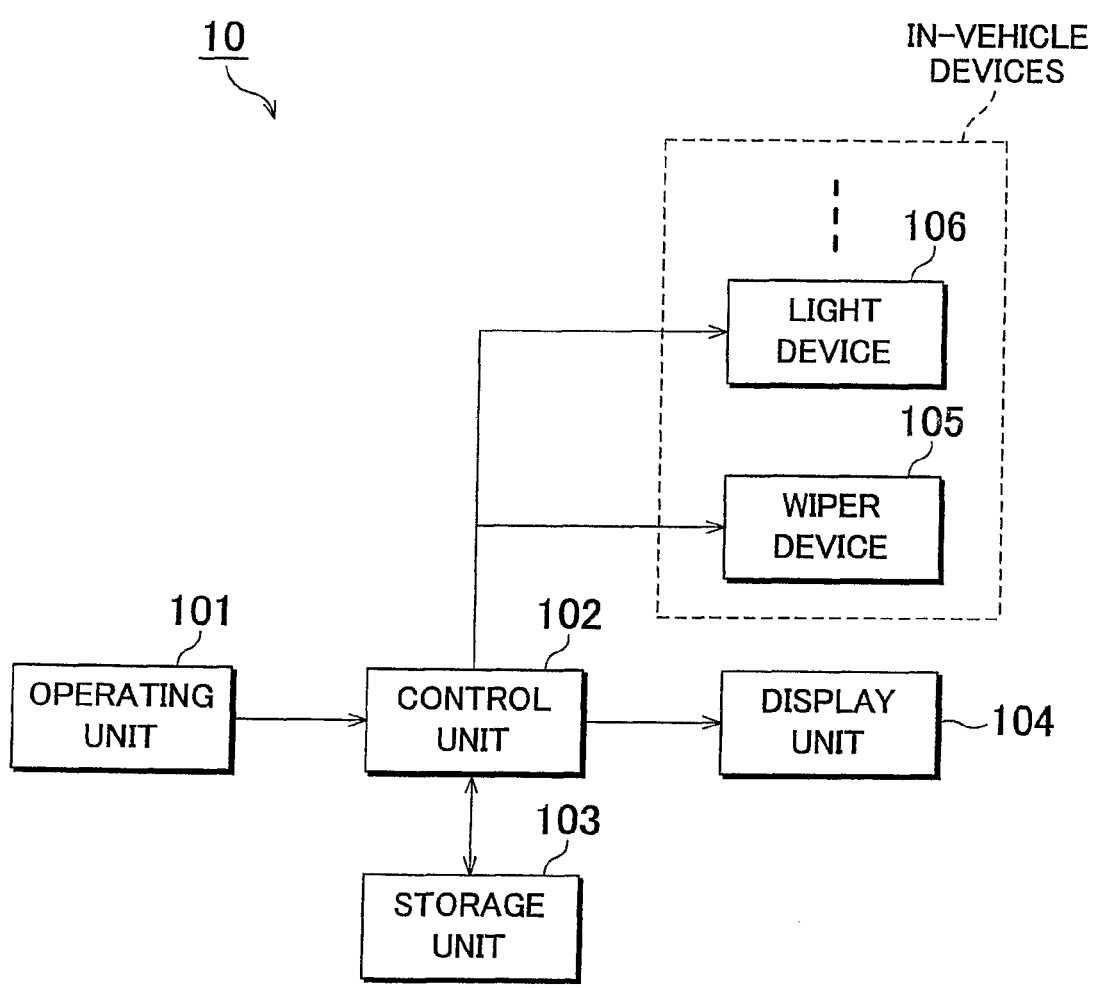
FIG. 1 is a block diagram showing the schematic constitution of an operating device according to an embodiment.

FIG. 1 is a block diagram showing the schematic constitution of an operating device 10 according to an embodiment. The operating device 10 includes an operating unit 101, a control unit 102, a storage unit 103, and a display unit 104. The operating device 10 further includes a wiper device 105 and a light device 106 serving as in-vehicle devices. Each of these constitutional elements will be described in detail below.

Figure 2:
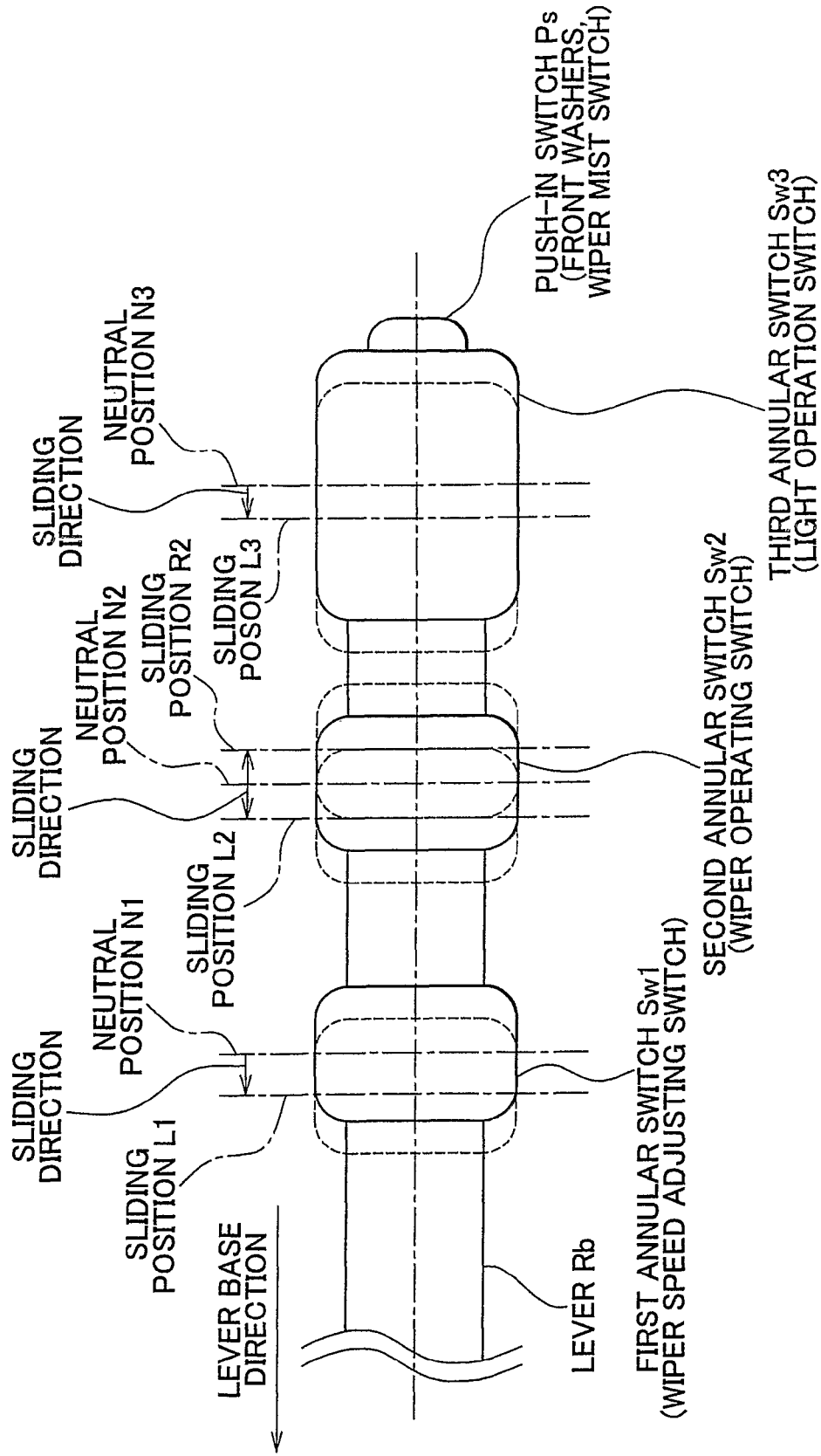
FIG. 2 is a view showing the schematic constitution of an operating unit.

First, the operating unit 101 will be described. FIG. 2 is a view showing an operating lever according to this embodiment as an example of the operating unit 101. The operating unit 101 shown in FIG. 2 is constituted by a lever Rb, a first annular switch Sw1, a second annular switch Sw2, a third annular switch Sw3, and a push-in switch Ps. By making the switches annular, the switches can be operated regardless of the position of the hands (fingers) in a circumferential direction of the lever.

In the lever Rb shown as an example in FIG. 2, the push-in switch Ps is provided on an end portion of the lever Rb in such a position that a central axis X of the lever Rb and a central axis of the push-in switch Ps substantially match, and the push-in switch Photographed subject can be depressed in an interior direction of the lever Rb. When the push-in switch Ps is depressed, the switch turns On, and when the push-in switch Ps is not depressed, the switch is Off. Note that in the description of this embodiment, it is assumed that the lever Rb is attached to a steering column, similarly to a typical operating lever for operating wipers or lights.

Two functions are allocated to the push-in switch Ps. A first function of the push-in switch Ps is to operate a front washer and a front wiper simultaneously. A second function of the push-in switch Ps is to activate a wiper MIST operation in which the front wiper performs a single reciprocating motion. The push-in switch Ps executes these two functions in accordance with a depression period. Note that the push-in switch Ps executes two functions in accordance with the depression period, and is not therefore a touch sensor, in contrast to the first to third annular switches Sw1 to Sw3 to be described below.

As shown in FIG. 2, the first to third annular switches Sw1 to Sw3 are respectively attached to the lever Rb in neutral positions so as to be capable of rotating about the lever Rb. Touch sensors that detect a contact state and a non-contact state are used as the first to third annular switches Sw1 to Sw3. Upon detection of a contact state (to be referred to hereafter simply as "contact"), the first to third annular switches Sw1 to Sw3 switch On, and upon detection of a non-contact state (to be referred to hereafter as "when contact can no longer be detected"), the first to third annular switches Sw1 to Sw3 switch Off. Any type of touch sensor that is capable of detecting contact may be used as the first to third annular switches Sw1 to Sw3 applied to the present invention, and an electrical capacitance touch sensor may be cited as an example. Finger or hand contact generated when a user operates the first to third annular switches Sw1 to Sw3 according to this embodiment may be cited as an example of the main type of contact detected by the switches.

In this embodiment, the wiper device 105 and the light device 106 are envisaged as the two in-vehicle devices that can be operated by the operating unit 101 shown in FIG. 2. In this embodiment, the third annular switch Sw3 is provided as a switch for operating the light device 106, as shown in FIG. 2. Further, in this embodiment, the second annular switch Sw2 is provided as a switch for operating the wiper device 105, as shown in FIG. 2. To achieve a further improvement in user-friendliness, the first annular switch Sw1 is provided as a switch for adjusting only an operation speed of the wiper device 105 in at least one of an AUTO mode and an INT mode of the wiper device 105. In other words, the in-vehicle devices to be operated are associated with the respective annular switches according to this embodiment in advance. Note, however, that in order to improve user-friendliness, a part of the functions (in this embodiment, the wiper operation speed) of the in-vehicle device may be allocated to an annular switch, as described above.

Furthermore, in this embodiment, a light and a fog lamp are envisaged as the two operation subjects included in the light device 106. Also, in this embodiment, a front wiper, a rear wiper, and a washer are envisaged as the three operation subjects included in the wiper device 105. The first to third annular switches Sw1 to Sw3 according to this embodiment are each constituted to be capable of operating the respective operation subjects in the in-vehicle device that is pre-associated therewith.

As shown in FIG. 2, the first to third annular switches Sw1 to Sw3 are respectively attached to the lever Rb so as to be capable of sliding from the neutral position in a predetermined sliding direction parallel to a lengthwise axis (the central axis X) of the lever Rb by a predetermined distance. More specifically, the first annular switch Sw1 is attached to be capable of sliding between a neutral position N1 and a sliding position L1 as shown in FIG. 2. The second annular switch Sw2 is attached to be capable of sliding between a neutral position N2 and sliding positions L2 and R2, as shown in FIG. 2. The third annular switch Sw3 is attached to be capable of sliding between a neutral position N3 and a sliding position 13, as shown in FIG. 2.

In this embodiment, by sliding the first to third annular switches Sw1 to Sw3 to these positions, an operation subject associated with each position is selected from the operation subjects pre-associated with the respective annular switches. More specifically, by sliding the first annular switch Sw1 to the neutral position N1 shown in FIG. 2, the operation speed of the front wiper in the AUTO mode is selected as the operation subject. Further, by sliding the first annular switch Sw1 to the sliding position L1 shown in FIG. 2, the operation speed of the rear wiper in the INT mode is selected as the operation subject.

By sliding the second annular switch Sw2 to the neutral position N2 shown in FIG. 2, the front wiper is selected as the operation subject. Further, by sliding the second annular switch Sw2 to the sliding position L2 shown in FIG. 2, the rear wiper is selected as the operation subject. Further, by sliding the second annular switch Sw2 to the sliding position R2 shown in FIG. 2, the washer is selected as the operation subject.

By sliding the third annular switch Sw3 to the neutral position N3 shown in FIG. 2, the light is selected as the operation subject. Further, by sliding the third annular switch Sw3 to the sliding position L3 shown in FIG. 2, the fog lamp is selected as the operation subject. Note that sliding the third annular switch Sw3 to the sliding position L3 and depressing the push-in switch Ps are performed separately.

Next, signals generated respectively by the first to third annular switches Sw1 to Sw3 will be described. The first to third annular switches Sw1 to Sw3 are formed from rotary momentary switches. A rotary momentary switch is a switch that enters an On state when rotated in any rotation direction and remains in an Off state when not rotated. The annular switches according to this embodiment generate the signals to be described below in an On state when rotated in any rotation direction and in an Off state when not rotated.

When the first annular switch Sw1 is rotated forward (toward an advancement direction side of the vehicle when the operating lever is attached to the steering column as described above) from the neutral position N1 or the sliding position L1, a forward rotation signal Fr1 indicating forward rotation is generated. In contrast, when the first annular switch Sw1 is rotated rearward (toward a driver side when the operating lever is attached to the steering column as described above) from the neutral position N1 or the sliding position L1, a rearward rotation signal Rr1 indicating rearward rotation is generated.

When the second annular switch Sw2 is rotated forward from the neutral position N2, the sliding position L2, or the sliding position R2, a forward rotation signal Fr2 indicating forward rotation is generated. In contrast, when the second annular switch Sw2 is rotated rearward from the neutral position N2, the sliding position L2, or the sliding position R2, a rearward rotation signal Rr2 indicating rearward rotation is generated.

When the third annular switch Sw3 is rotated forward from the neutral position N3 or the sliding position L3, a forward rotation signal Fr3 indicating forward rotation is generated. In contrast, when the third annular switch Sw3 is rotated rearward from the neutral position N3 or the sliding position L3, a rearward rotation signal Rr3 indicating rearward rotation is generated.

This completes the description of the respective signals generated by the first to third annular switches Sw1 to Sw3. Note that these signals are processed by the control unit 102, and this processing will be described in detail below.

In this embodiment, it is assumed that when a restraining force (the contact restraining force described above and so on) is released after the first to third annular switches Sw1 to Sw3 have been caused to slide from their respective neutral positions, the switches return to their respective neutral positions naturally due to a return force of an elastic body such as a spring. This completes the description of the operating unit 101 according to this embodiment.

Next, the control unit 102 will be described. The control unit 102 processes operation mode values to be described below on the basis of the signals generated by the operating unit 101, and specifies an operation mode, which is selected by referring to the operation mode values and a storage table to be described below, for each operation subject. The control unit 102 also operates the display unit 104 and the in-vehicle devices (in this embodiment, the wiper device 105 and the light device 106) on the basis of the signals generated by the operating unit 101. Note that the specific control processing performed by the control unit 102 will be described below.

Next, the storage unit 103 will be described. The storage unit 103 according to this embodiment stores selected operation modes as operation mode values. The specific operation mode values stored by the storage unit 103 according to this embodiment include a light mode value Ri indicating a selected light operation mode, a fog mode value Fo indicating a fog lamp operation mode, a washer mode value Wa indicating a washer operation mode, a front wiper mode value Wi indicating a front wiper operation mode, a rear wiper mode value Rw indicating a rear wiper operation mode, a front wiper speed value Wv indicating the operation speed of the front wipers in the AUTO mode, and a rear wiper speed value Rv indicating the operation speed of the rear wiper during an intermittent operation (in the INT mode).

The storage unit 103 according to this embodiment stores a storage table such as that shown in FIG. 3. The storage table stored in the storage unit 103 includes information for associating the operation mode values described above with the respective operation modes of the operation subjects. The control unit 102 can specify the selected operation mode of each operation subject by referring to the operation mode values and the storage table.

As will be described below, in this embodiment, the respective rotation directions of the first to third annular switches Sw1 to Sw3 are associated with the display position of an operation mode image, to be described below, which is displayed on a display screen of the display unit 104 and corresponds to the operation mode selected when the corresponding annular switch is rotated. Hence, the storage table stored in the storage unit 103 must be created in consideration of these associations. A method of creating the storage table according to this embodiment will be described below.

Further, when an ignition key is switched On or Off, all of the operation mode values stored in the storage unit 103 may be initialized to zero, i.e. all operation subjects may be switched Off. Alternatively, when the ignition key is switched Off, the operation mode values of all of the currently selected operation subjects may be stored in a non-volatile storage device.

Figure 4:
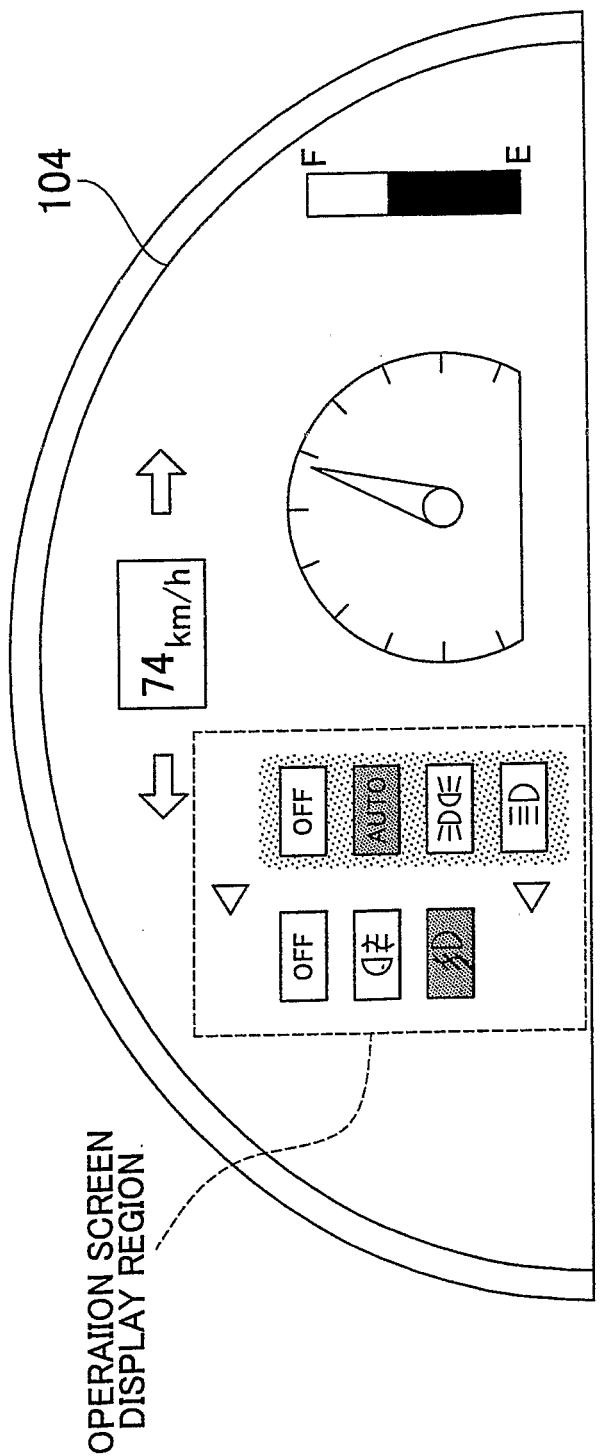
FIG. 4 is a view showing the outer appearance of a display unit.

Next, the display unit 104 will be described. The display unit 104 according to this embodiment is provided in an instrument panel of the vehicle, as shown in FIG. 4, for example. The display screen of the display unit 104 displays a speedometer indicating the vehicle speed of the vehicle, a tachometer indicating the rotation speed of the engine, a fuel gauge indicating the remaining fuel amount, and so on. However, these displays are unrelated to the present invention, and description thereof has been omitted. Of the display region of the display screen provided on the display unit 104, the display provided in an operation screen display region shown in FIG. 4 will be described. Note that the entire display screen of the display unit 104 may be constituted by a TFT liquid crystal display device or the like, or the speedometer, tachometer and so on may be analog meters. However, the aforementioned operation screen display region is preferably constituted by an image display device such as a TFT liquid crystal display device.

Screens corresponding to each of the in-vehicle devices described above or each operation subject are displayed in the operation screen display region of the display unit 104 according to this embodiment. The user can operate the operation subjects of the in-vehicle devices by operating the operating unit 101 while viewing the display on the display unit 104.

More specifically, as described above, the second and third annular switches Sw2 and Sw3 are provided to operate the wiper device 105 and light device 106 provided as in-vehicle devices. The first annular switch Sw1 is provided to adjust the operation speed of the wiper device 105. When the first to third annular switches Sw1 to Sw3 detect contact, an operation screen showing the operation subjects that can be operated by the respective switches is displayed on the display screen of the display unit 104. A display screen displayed when the third annular switch Sw3 detects contact will be described below as an example of a display screen displayed on the display unit 104 according to this embodiment.

Figure 5:
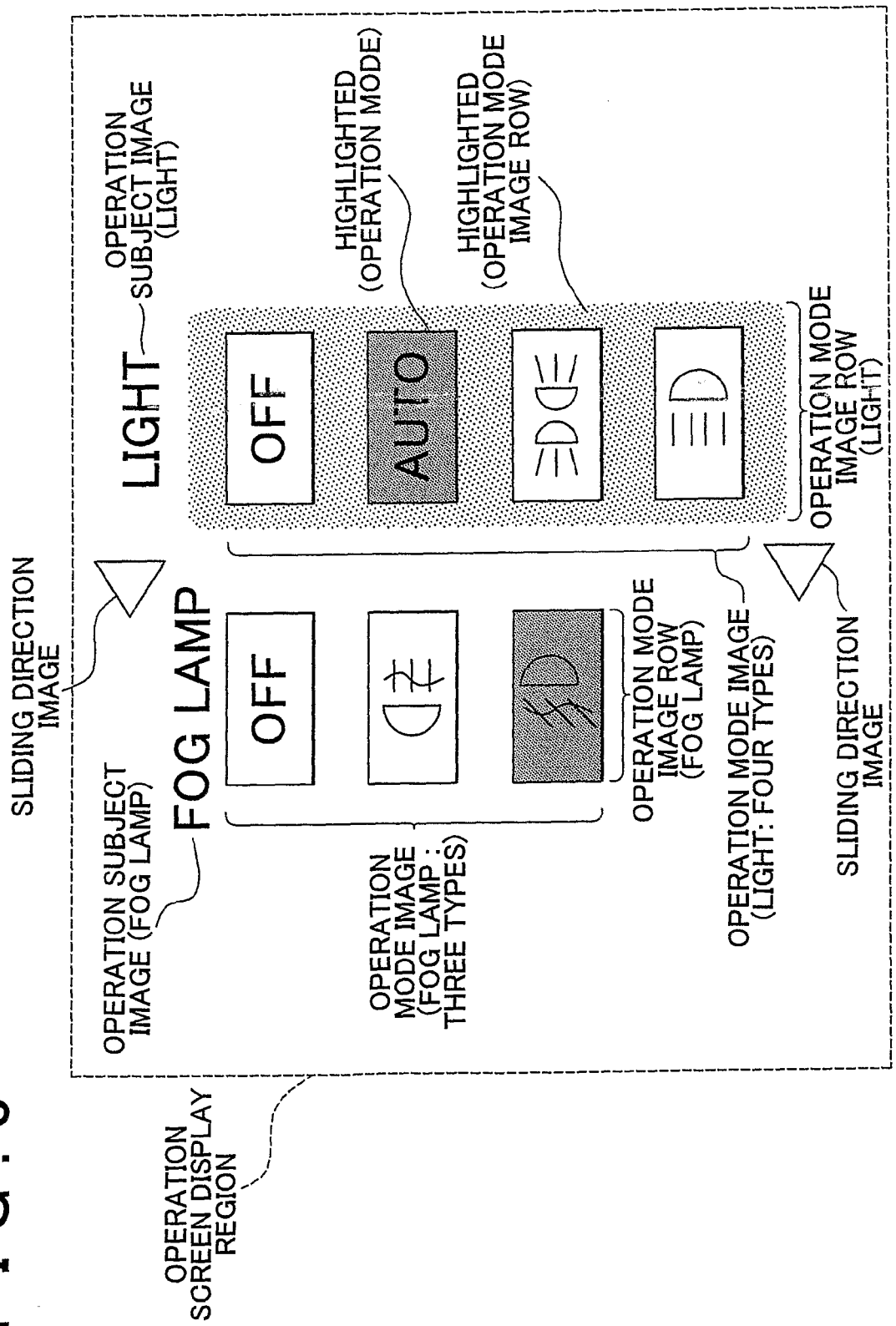
FIG. 5 is a view showing an example of a light operation screen.

FIG. 5 is a view showing an example of a display screen of the display unit 104, displaying a light operation screen which is displayed when the third annular switch Sw3 detects contact such that the light device 106 is selected as the in-vehicle device to be operated. The display screen shown in FIG. 5 displays images for operating the respective operation modes of the two operation subjects included in the light device 106, i.e. the light and the fog lamp.

More specifically, four operation mode images corresponding to four operation modes (function groups), namely light Off, AUTO mode, low beam and high beam, and depicting these operation modes in alphabetic characters or patterns are disposed on the display screen shown in FIG. 5 in a single row in the vertical direction of the display screen, and together constitute an operation mode image row. Further, three operation mode images corresponding to three operation modes (function groups), namely fog lamp Off, front fog lamp On and rear fog lamp On, and depicting these operation modes (function groups) in alphabetic characters or pictures are disposed on the display screen shown in FIG. 5 in a single row in the vertical direction of the display screen, and together constitute an operation mode image row. In other words, on the display screen of the display unit 104 according to this embodiment, the operation mode (function group) images of each operation subject are displayed in rows as operation mode image rows. Further, as shown in FIG. 5, operation subject images depicting the operation subjects corresponding to the respective operation mode image rows are displayed in alphabetic characters at the top of the respective operation mode image rows on the display screen of the display unit 104. Note that in FIG. 5, the operation mode image row is constituted by a single row of operation mode images disposed in the vertical direction of the display screen, but the respective operation mode image rows may be disposed in a horizontal direction or any other direction. Further, the operation subject image does not necessarily have to be displayed on the display screen of the display unit 104.

As shown in FIG. 5, on the display screen of the display unit 104 according to this embodiment, a background of the operation mode image row of the currently selected operation subject, i.e. a region including at least a display region on the display screen of the display unit 104 displaying the operation mode images of all of the operation modes of the operation subject, is displayed in a highlighted fashion (hereafter, this highlighted display will be referred to simply as "the operation mode image row is highlighted"). On the other hand, the background of the operation mode image row of the currently unselected operation subject is displayed normally. In the example shown in FIG. 5, the background of the operation mode image row relating to the light, which is one of the operation subjects, is highlighted. Thus, the user can easily understand that the currently selected operation subject is the light.

On the display screen of the display unit 104 according to this embodiment, the operation mode image corresponding to the currently selected operation mode of each operation subject is highlighted. On the other hand, the currently unselected operation mode images are displayed normally. In the example shown in FIG. 5, the currently selected operation modes of the light and the fog lamp are indicated to be the AUTO mode and rear fog lamp On, respectively.

In this embodiment, the respective sliding positions of the first to third annular switches Sw1 to Sw3 are associated with the display positions of the operation mode image rows relating to the respective operation subjects on the display screen of the display unit 104. Hence, a sliding direction image indicating a direction corresponding to the sliding direction of the annular switch for selecting a different operation subject to the currently selected operation subject is displayed on the display screen of the display unit 104 in the manner shown in FIG. 5.

The sliding direction image shown in the example of FIG. 5 indicates the sliding direction of the third annular switch Sw3 for switching the selected operation subject from the light to the fog lamp. As described above, in this embodiment, the fog lamp is selected as the operation subject by sliding the third annular switch Sw3 in a leftward direction (a base direction of the lever Rb) from the neutral position N3 to the sliding position L3. Hence, when the light is selected as the operation subject, a sliding direction image indicating the leftward direction is displayed on the display screen of the display unit 104 shown in FIG. 5 in two locations, namely above and below a gap between the operation mode image row for the light and the operation mode image row for the fog lamp. Note that the display positions of the sliding direction images on the display screen of the display unit 104 are not limited to the display positions shown in FIG. 5, and the sliding direction images may be provided in other positions or in a number other than two.

Moreover, in this embodiment the respective rotation directions of the first to third annular switches Sw1 to Sw3 are associated in advance with selection directions of the operation mode images selected when the switches are rotated on the display screen of the display unit 104. More specifically, when an annular switch is rotated forward, an operation mode corresponding to the operation mode image displayed on the display screen of the display unit 104 in an upward direction position relative to the operation mode image corresponding to the currently selected operation mode is selected. When the annular switch is rotated rearward, on the other hand, an operation mode corresponding to the operation mode image displayed on the display screen of the display unit 104 in a downward direction position relative to the operation mode image corresponding to the currently selected operation mode is selected.

More specifically, when the annular switch is rotated forward, the operation mode corresponding to the operation mode image displayed on the display screen of the display unit 104 immediately above the operation mode image corresponding to the operation mode selected prior to rotation is selected every time the annular switch is rotated. When the annular switch is rotated rearward, on the other hand, the operation mode corresponding to the operation mode image displayed on the display screen of the display unit 104 immediately below the operation mode image corresponding to the operation mode selected prior to rotation is selected every time the annular switch is rotated.

Figure 6:
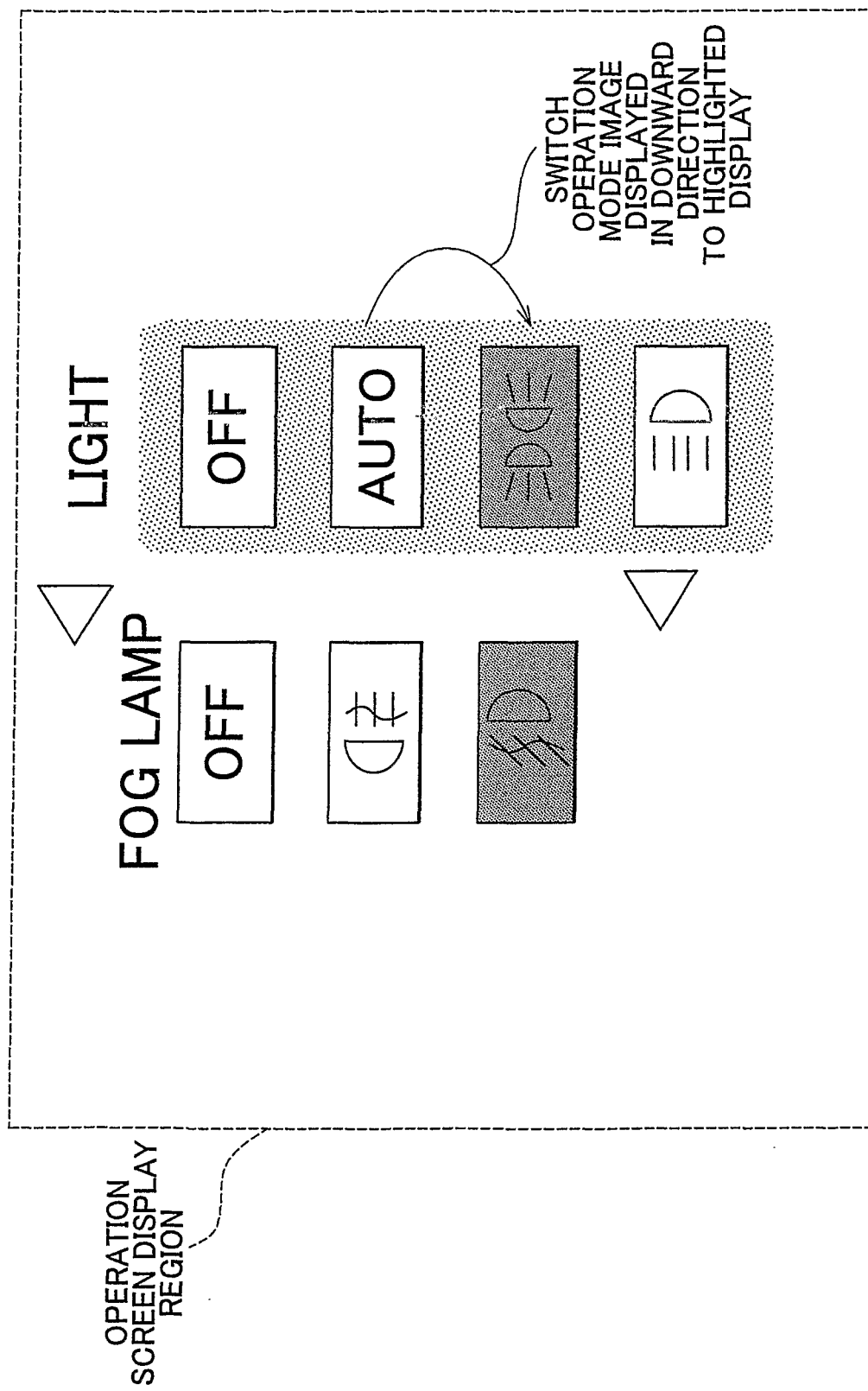
FIG. 6 is a view showing an example of the light operation screen.

The association between the rotation direction of the annular switches and the selection direction of the operation mode images will now be described in further detail with reference to FIGS. 5 and 6. FIG. 6 is a view showing the display screen of the display unit 104 following a single rearward rotation of the third annular switch Sw3 from a state in which the AUTO mode is selected as the operation mode of the light, i.e. when the display shown in FIG. 5 is displayed on the display screen of the display unit 104. As shown in FIG. 6, in this embodiment, the selected operation mode of the light is switched from the AUTO mode to the low beam mode by rotating the third annular switch Sw3 once rearward. As a result, the operation mode image corresponding to the AUTO mode is displayed normally and the operation mode image corresponding to the low beam mode is highlighted at the same time. By associating the rotation directions of the respective annular switches with the selection directions of the operation mode images on the display screen of the display unit 104 in this manner, the user can avoid rotating the annular switches in the wrong direction even while unable to view his/her hands directly.

Here, a method of creating the storage table described above for realizing the association between the rotation direction of the annular switches and the selection direction of the operation mode images will be described in detail. In this embodiment, the control unit 102 increments the operation mode value of the selected operation subject by 1 upon acquisition of the aforementioned forward rotation signal, generated every time the annular switch is rotated forward. On the other hand, the control unit 102 decrements the operation mode value of the selected operation subject by 1 upon acquisition of the aforementioned rearward rotation signal, generated every time the annular switch is rotated rearward. Therefore, the operation mode values listed in the storage table must be listed in association with the operation modes such that when the operation mode value is incremented by 1, the operation mode corresponding to the operation mode image displayed in the upward direction on the display screen of the display unit 104 is selected, and when the operation mode value is decremented by 1, the operation mode corresponding to the operation mode image displayed in the downward direction on the display screen of the display unit 104 is selected. For this purpose, the operation mode values listed in the storage table shown in FIG. 3 take consecutive integer values corresponding to the number of selectable operation modes in each operation subject. This method is employed as a storage table creation method according to this embodiment.

Figure 7:
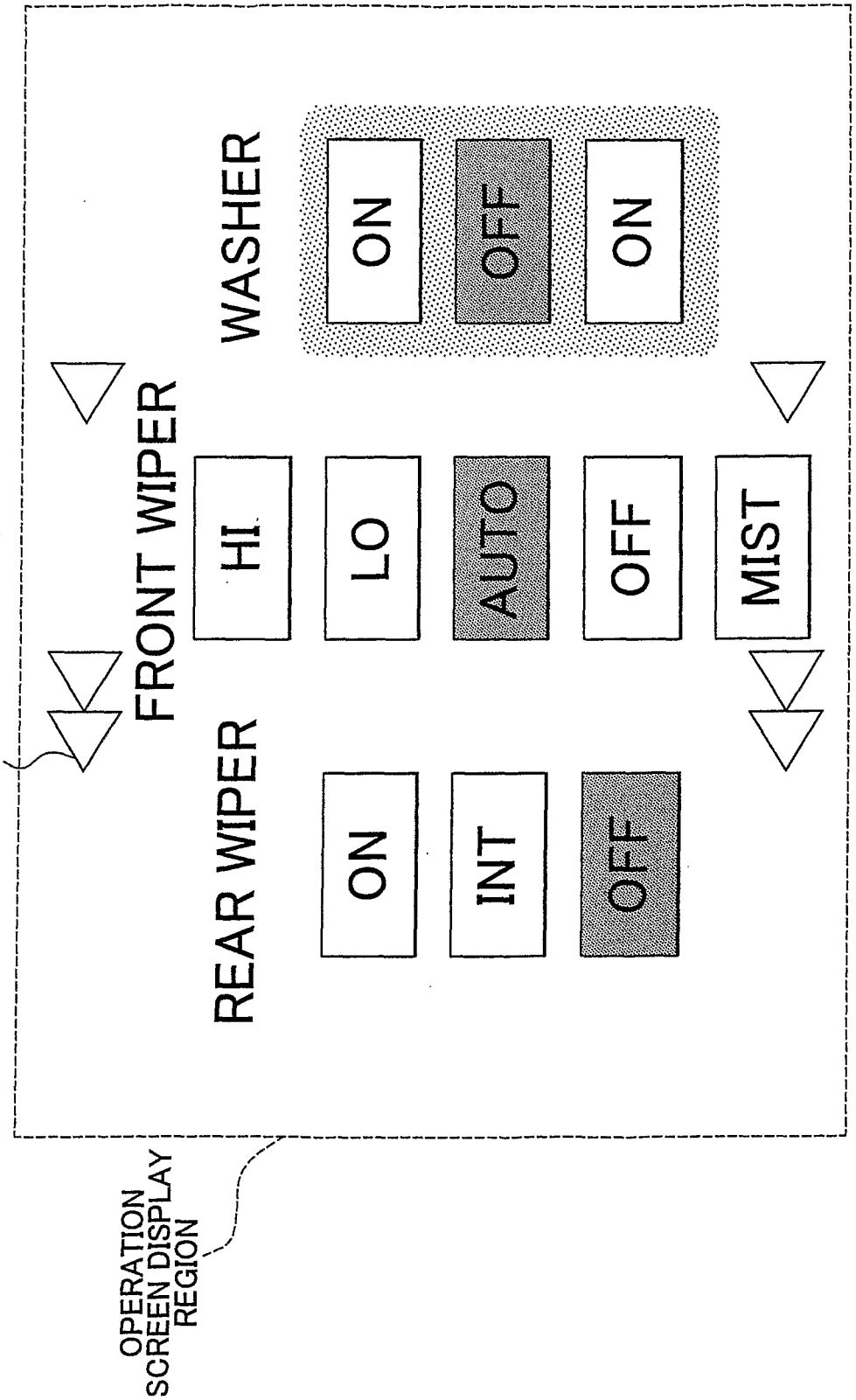
FIG. 7 is a view showing an example of a wiper operation screen.

FIG. 7 is a view showing the display screen of the display unit 104 displaying a wiper operation screen when the second annular switch Sw2 detects contact and is caused to slide to the sliding position R2, or in other words when the annular switch for operating the wiper device 105 detects contact and the washer is selected as the operation subject. In this embodiment, regardless of the annular switch that detects contact, a display for operating the in-vehicle device pre-associated with the annular switch is displayed on the display screen of the display unit 104 in a more or less identical manner to the case described above, in which the third annular switch Sw3 detects contact, despite the differences in the type and number of selectable operation subjects and the number of operation mode images displayed in relation to the respective operation subjects. Note, however, that when three or more selectable operation subjects exist such that three or more operation mode image rows are displayed, and two or more operation mode image rows are displayed in an identical direction from the display position of the operation mode image row corresponding to the currently selected operation subject, as shown in FIG. 7, sliding direction images may be displayed continuously in a number corresponding to the number of the times the annular switch must be slid to select an operation subject corresponding to an operation mode image row displayed two or more positions away from the operation mode image row corresponding to the currently selected operation subject.

When the washer is selected as the operation subject, as shown in FIG. 7, for example, two continuous sliding direction images are displayed to indicate that the second annular switch Sw2 must be slid twice, or in other words slid from the sliding position R2 to the neutral position N2 and then slid from the neutral position N2 to the sliding position L2, in order to select the rear wiper as the operation subject.

Figure 8:
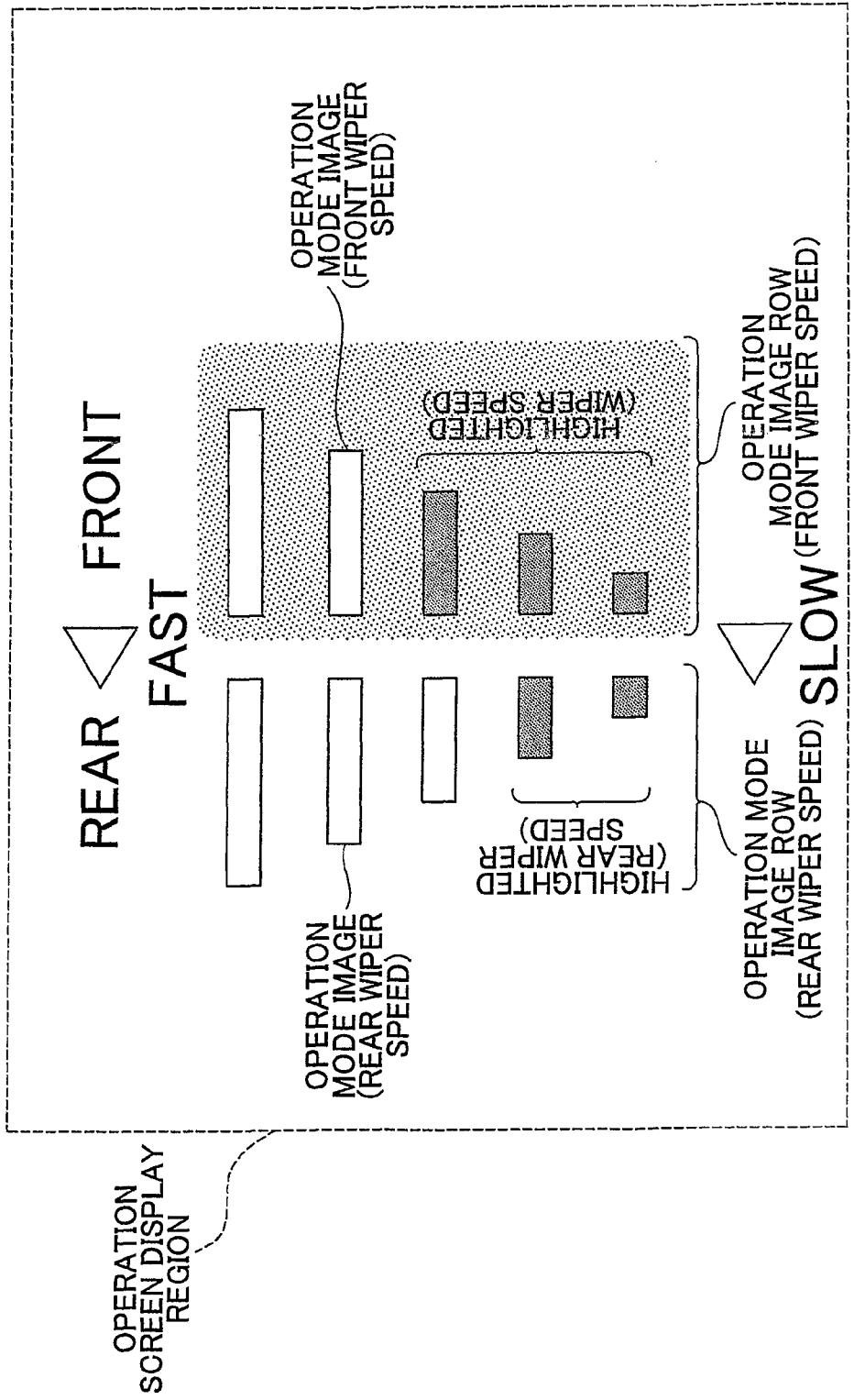
FIG. 8 is a view showing an example of a wiper speed adjustment screen.

FIG. 8 is a view showing the display screen of the display unit 104 when the first annular switch Sw1 detects contact such that a wiper speed adjustment screen is displayed on the display screen. When the first annular switch Sw1 detects contact in this embodiment, the operation mode images displayed on the display screen of the display unit 104 differ from the operation mode images displayed on the display screen when another annular switch detects contact.

More specifically, when the first annular switch Sw1 detects contact, operation mode image rows which indicate the operation speed of the front wiper in the currently selected AUTO mode and the operation speed of the rear wiper in the currently selected INT mode by the number of highlighted operation mode images relating respectively thereto are displayed in accordance with the front wiper operation speed and rear wiper operation speed operation subjects, respectively, as shown in FIG. 8. The example in FIG. 8 shows the display screen of the display unit 104 when the operation speed of the front wiper in the AUTO mode is "3" and the operation speed of the rear wiper in the INT mode is "2". Further, in the example shown in FIG. 8, as the front wiper speed and the rear wiper speed increase, the operation mode images displayed above the operation mode image displayed at the bottom of the display screen of the display unit 104 are highlighted in succession.

Note, however, that on the wiper speed adjustment screen shown in FIG. 8, the association between the rotation directions of the annular switches and the selection directions of the operation mode images and the association between the sliding positions of the annular switches and the display positions on the display screen of the display unit 104 of the operation mode image rows corresponding to the respective operation subjects are similar to those of the light adjustment screen shown in FIG. 5.

More specifically, when the first annular switch Sw1 is rotated once rearward in a case where the display shown in FIG. 8 is displayed, i.e. a case where "3" is selected as the speed of the front wiper, serving as the operation subject, in the AUTO mode, "2" is selected as the operation speed of the front wiper in the AUTO mode, and of the operation mode images included in the operation mode image row corresponding to the operation speed of the front wiper, the operation mode images up to the second operation mode image from the bottom of the display screen of the display unit 104, i.e. the operation mode images up to the operation mode image displayed immediately below the highlighted operation mode images in FIG. 8, are highlighted. Meanwhile, when "2" is selected as the operation speed of the front wiper, the operation mode images other than the operation mode images up to the second operation image from the bottom of the display screen of the display unit 104, from among the operation mode images included in the operation mode image row corresponding to the operation speed of the front wiper, are displayed normally.

Further, when "2" is selected as the operation speed of the rear wiper serving as the operation subject and the first annular switch Sw1 is rotated once forward, "3" is selected as the operation speed of the rear wiper in the INT mode, and of the operation mode images included in the operation mode image row corresponding to the operation speed of the rear wiper, the operation mode images up to the third operation mode image from the bottom of the display screen of the display unit 104, i.e. the operation mode images up to the operation mode image displayed immediately above the highlighted operation mode images in FIG. 8, are highlighted. Meanwhile, when "3" is selected as the operation speed of the rear wiper, the operation mode images other than the operation mode images up to the third operation image from the bottom of the display screen of the display unit 104, from among the operation mode images included in the operation mode image row corresponding to the speed of the rear wiper, are displayed normally.

Figure 9:
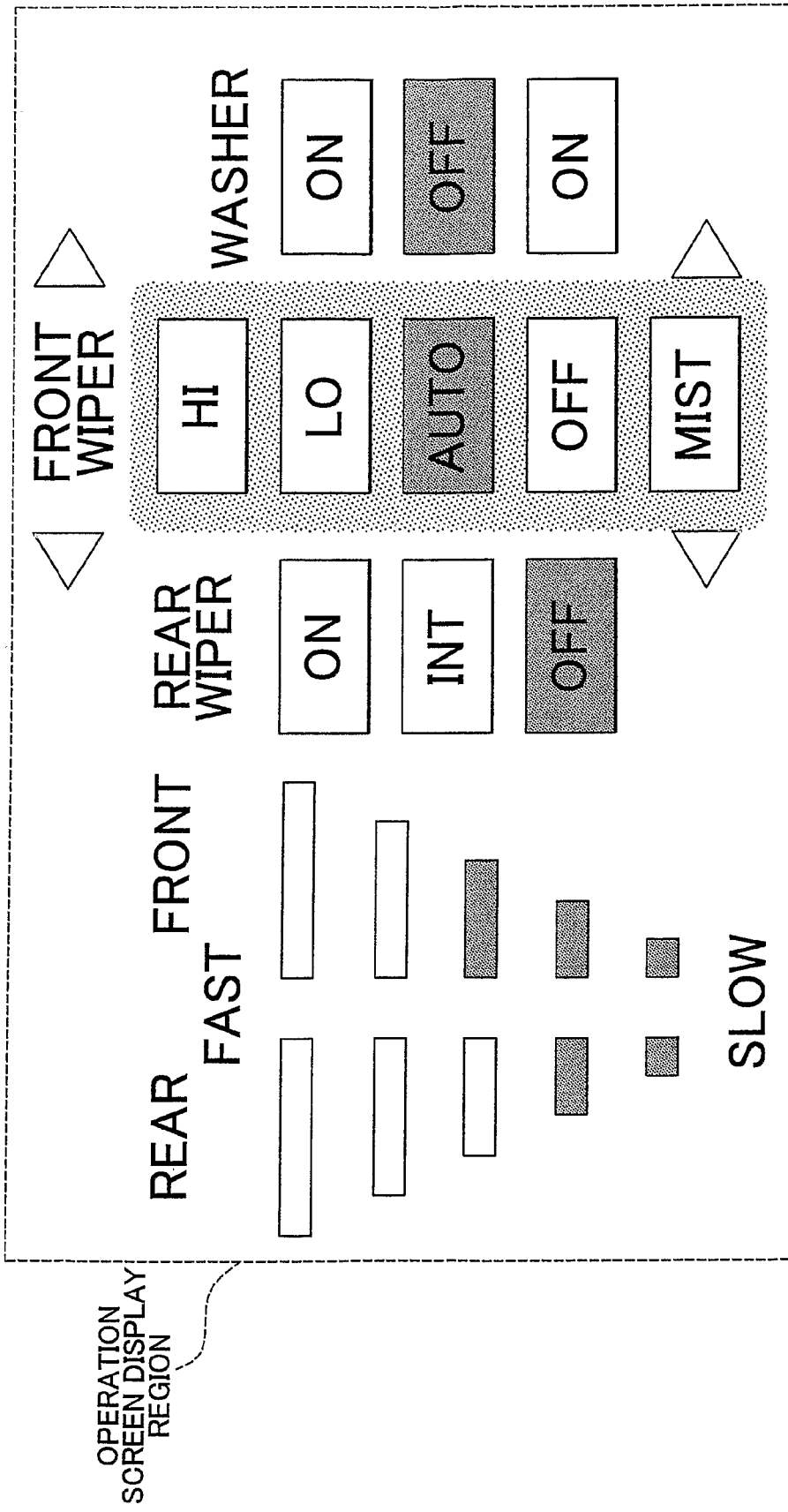
FIG. 9 is a view showing an example of a screen displaying the wiper speed screen together with the wiper operation screen.

The wiper operation screen and the wiper speed adjustment screen were described separately above with reference to FIGS. 7 and 8, respectively. As shown in FIG. 9, the wiper speed adjustment screen shown in FIG. 8 may be displayed together with the wiper operation screen in the operation screen display region. Note, however, that when display is performed as shown in FIG. 9, the wiper speed is not adjusted, and therefore the operation mode image rows corresponding to the front wiper speed and rear wiper speed operation subjects need not be highlighted.

Figure 10:
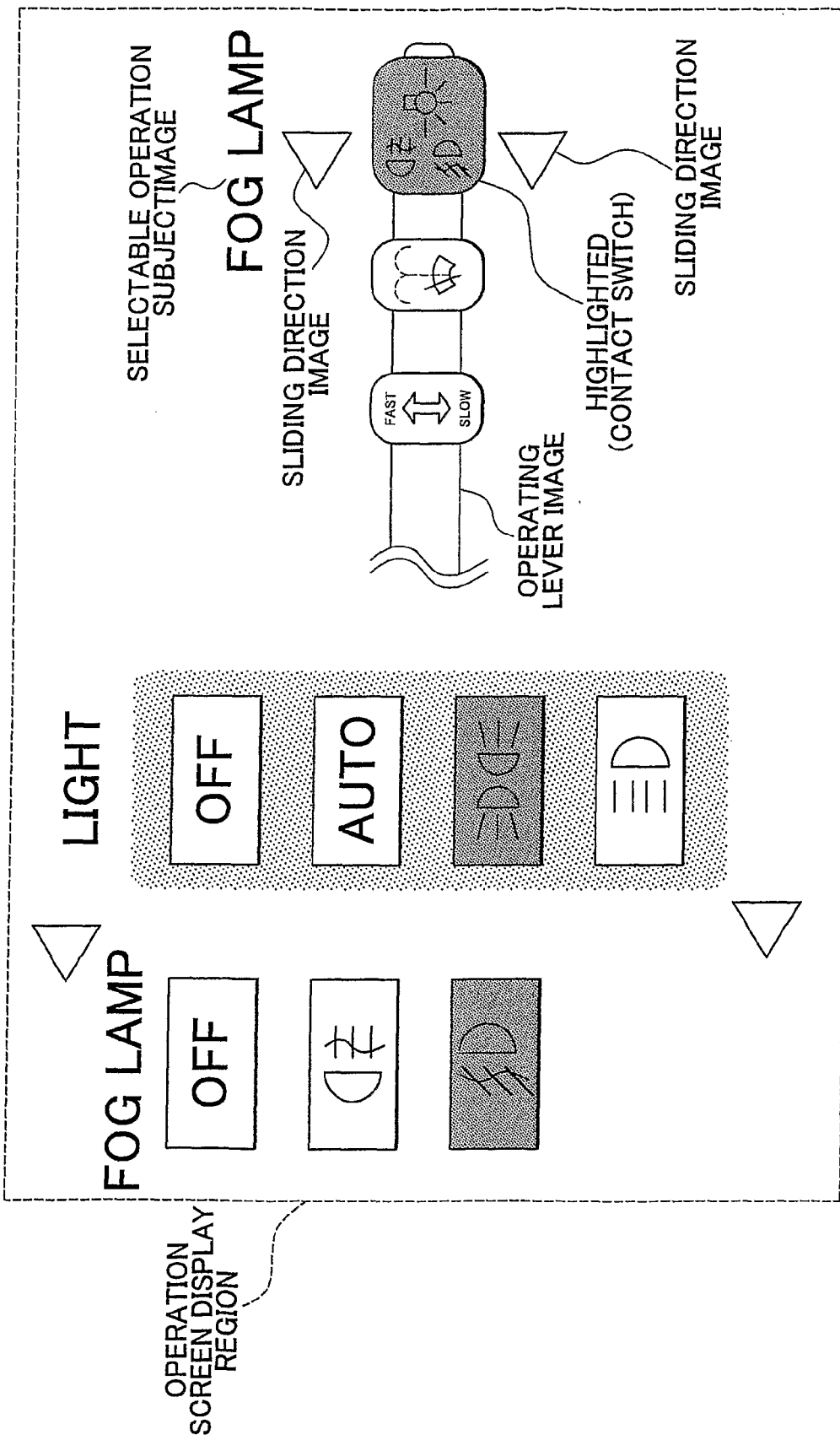
FIG. 10 is a view showing an example of a screen displaying an operating lever image.

Further, when the wiper speed adjustment screen, the wiper operation screen, and the light operation screen are displayed respectively within the operation screen display region in this embodiment, an operating lever image simulating the operating lever provided with the annular switches may be displayed in the operation screen display region at the same time, as shown in FIG. 10. FIG. 10 is a view showing an example in which the display screen of the display unit 104 displays the light operation screen and the operating lever image, from among the wiper speed adjustment screen, the wiper operation screen and the light operation screen, in the operation screen display region at the same time. Furthermore, in this embodiment, a region corresponding to the annular switch that has detected contact may be highlighted within the operating lever image displayed in the operation screen display region. Further, when the operating lever image is displayed on the display screen of the display unit 104, the sliding direction image described above may be displayed both above and below the operating lever image. Further, when the operating lever image and the sliding direction image are displayed on the display screen of the display unit 104, a selectable operation subject images indicating in alphabetic characters the operation subject that is selected by sliding the annular switch in the direction corresponding to the sliding direction image may be displayed above the operating lever image. In the example of the display screen of the display unit 104 shown in FIG. 10, sliding direction images are displayed both above and below the operating lever image, and a selectable operation subject image indicating that the fog lamp can be selected is displayed as the aforementioned selectable operation subject image.

This completes description of the display screen of the display unit 104 according to this embodiment. Note that on the light operation screen in FIG. 5, the sliding direction image, the operation subject image, highlighting (of the operation subject, the operation mode, and the operation mode image row), the operation mode image, and so on are described individually using lead lines in order to provide a basic description of the display screen of the display unit 104 according to this embodiment, but since these images and display formats are similar, description thereof is omitted from FIGS. 6 to 10. Further, highlighting means displaying the operation mode image corresponding to the currently selected operation mode and the operation mode image row corresponding to the operation subject in a different way to normal display such that the selected operation mode and operation subject are emphasized and can be comprehended easily by the user. Furthermore, the functions groups of each operation subject are displayed in rows, and therefore the driver can recognize the currently selected function or a function to be selected easily. Hence, this embodiment exhibits superior user-friendliness.

Next, the wiper device 105 and light device 106 will be described. As described above, in this embodiment only two devices, namely the wiper device 105 and the light device 106, are envisaged as in-vehicle devices. Further, three operation subjects, namely the front wiper, the rear wiper, and the washer, are envisaged in this embodiment as the operation subjects included in the wiper device 105, while two operation subjects, namely the light and the fog lamp, are envisaged in this embodiment as the operation subjects included in the light device 106. The in-vehicle devices, or the operation subjects, are operated in accordance with processing performed by the control unit 102 on the basis of the signals generated by the operating unit 101.

Note that the in-vehicle devices provided in the operating device 10 according to this embodiment are not limited to the wiper device 105 and the light device 106, and various other in-vehicle devices such as a power window device and a seat adjustment device may be provided. Further, the operation subjects included in the wiper device 105 are not limited to the front wiper, the rear wiper, and the washer, and any other operation subjects conceivable as operation subjects of the wiper device 105 may be included. This applies similarly to other in-vehicle devices, including the light device 106. This completes description of the respective constitutional elements constituting the operating device 10 according to this embodiment.

Next, specific processing of this embodiment, which is executed by the control unit 102 included in the operating device 10 having the constitution described above, will be described with reference to flowcharts. It is assumed that, at the starting point of the processing of all flowcharts indicated in the description of this embodiment, the operation mode values stored in the storage unit 103 in relation to all of the currently selected operation subjects are set at zero.

Figure 11:
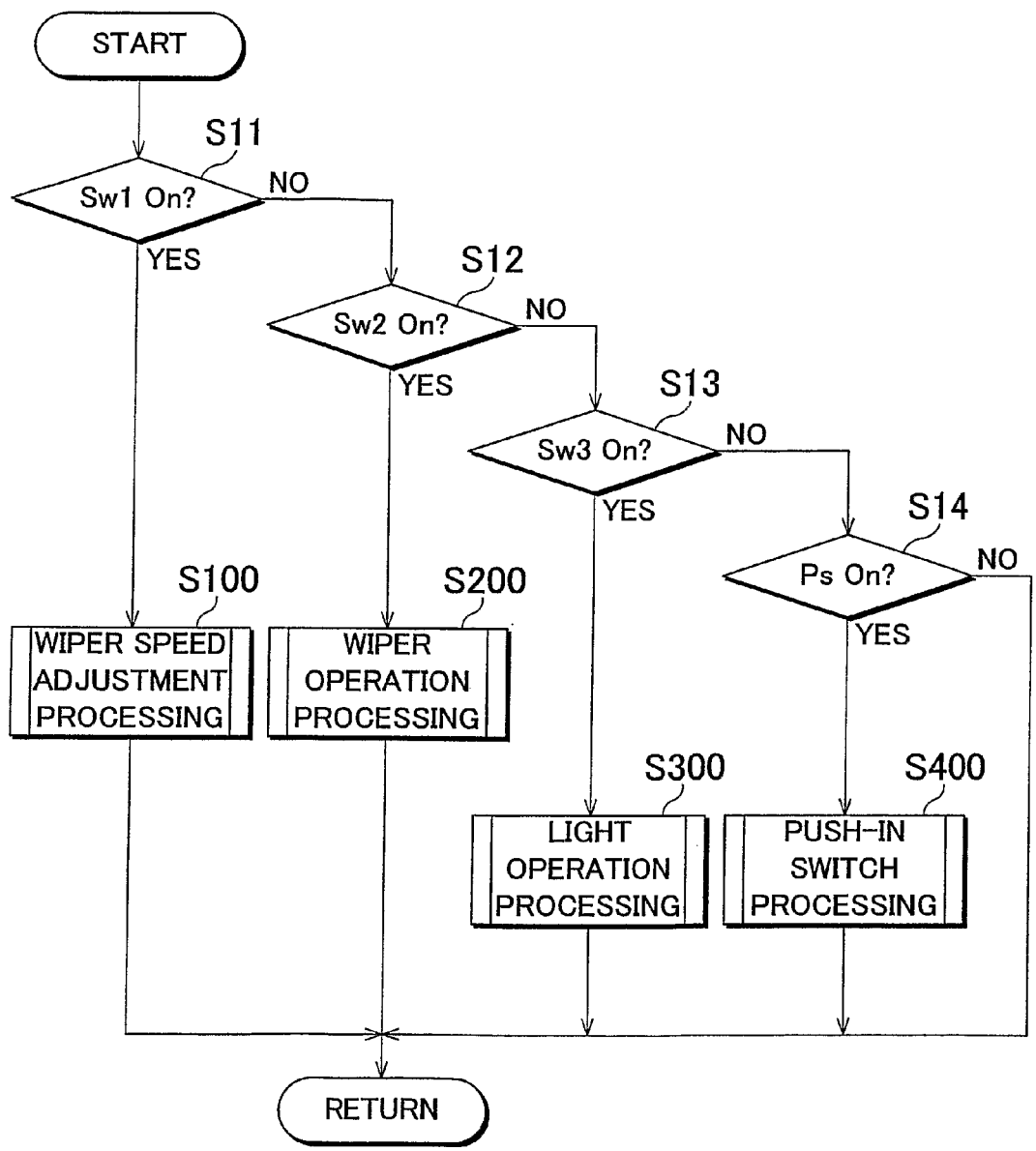
FIG. 11 is a view showing processing of a control unit according to the embodiment.

A flowchart shown in FIG. 11 illustrates processing performed by the control unit 102 according to this embodiment to determine whether or not any one of the first to third annular switches Sw1 to Sw3 and the push-in switch Ps provided in the operating unit 101 is On, and to display one of the wiper operation screen, the wiper speed adjustment screen, and the light operation screen in accordance with the switch that is On.

In a step S11, the control unit 102 determines whether or not the first annular switch Sw1 is On after detecting contact. When the control unit 102 determines in the step S11 that the first annular switch Sw1 is On, the processing advances to a step S100. When the control unit 102 determines that the first annular switch Sw1 is not On, on the other hand, the processing advances to a step S12.

In the step S12, the control unit 102 determines whether or not the second annular switch Sw2 is On after detecting contact. When the control unit 102 determines in the step S12 that the second annular switch Sw2 is On, the processing advances to a step S200. When the control unit 102 determines that the second annular switch Sw2 is not On, on the other hand, the processing advances to a step S13.

In the step S13, the control unit 102 determines whether or not the third annular switch Sw3 is On after detecting contact. When the control unit 102 determines in the step S13 that the third annular switch Sw3 is On, the processing advances to a step S300. When the control unit 102 determines that the third annular switch Sw3 is not On, on the other hand, the processing advances to a step S14.

In the step S14, the control unit 102 determines whether or not the push-in switch Ps is On after being depressed. When the control unit 102 determines in the step S14 that the push-in switch Ps is On, the processing advances to a step S400. When the control unit 102 determines that push-in switch Ps is not On, on the other hand, the processing shown in FIG. 11 is repeated from the step S11.

In the step S100, the control unit 102 begins wiper speed adjustment processing. The wiper speed adjustment processing will be described in detail below. When the control unit 102 completes the wiper speed adjustment processing of the step S100, the processing shown in the flowchart of FIG. 11 is repeated from the step S11.

In the step S200, the control unit 102 begins wiper operation processing. The wiper operation processing will be described in detail below. When the control unit 102 completes the wiper operation processing of the step S200, the processing shown in FIG. 11 is repeated from the step S11.

In the step S300, the control unit 102 begins light operation processing. The light operation processing will be described in detail below. When the control unit 102 completes the light operation processing of the step S300, the processing shown in FIG. 11 is repeated from the step S11.

In the step S400, the control unit 102 begins push-in switch processing. The push-in switch processing will be described in detail below. When the control unit 102 completes the push-in switch processing of the step S400, the processing shown in FIG. 11 is repeated from the step S11.

Figure 12:
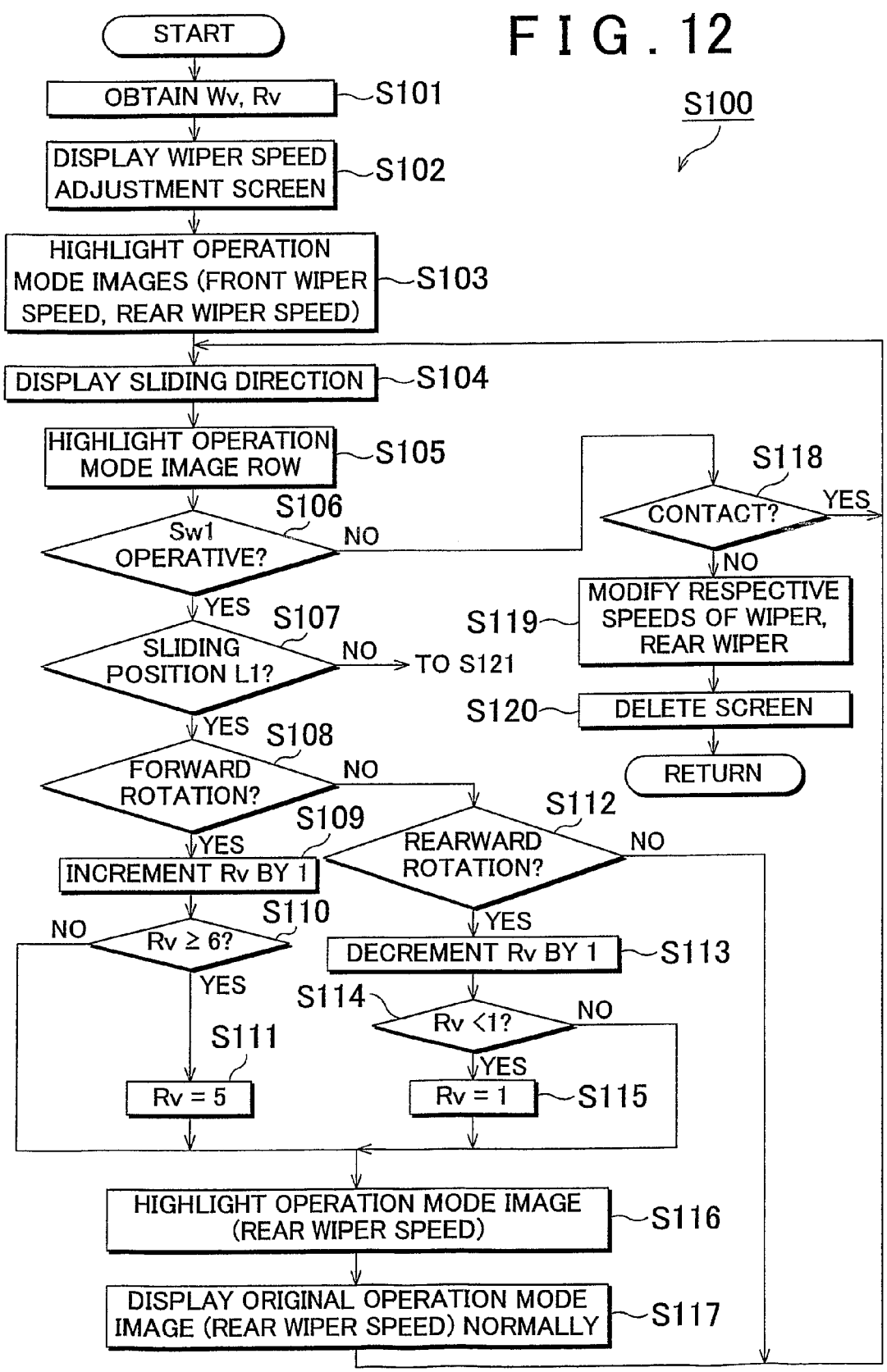
FIG. 12 is a view showing an example of wiper speed adjustment processing according to the embodiment.
Figure 13:
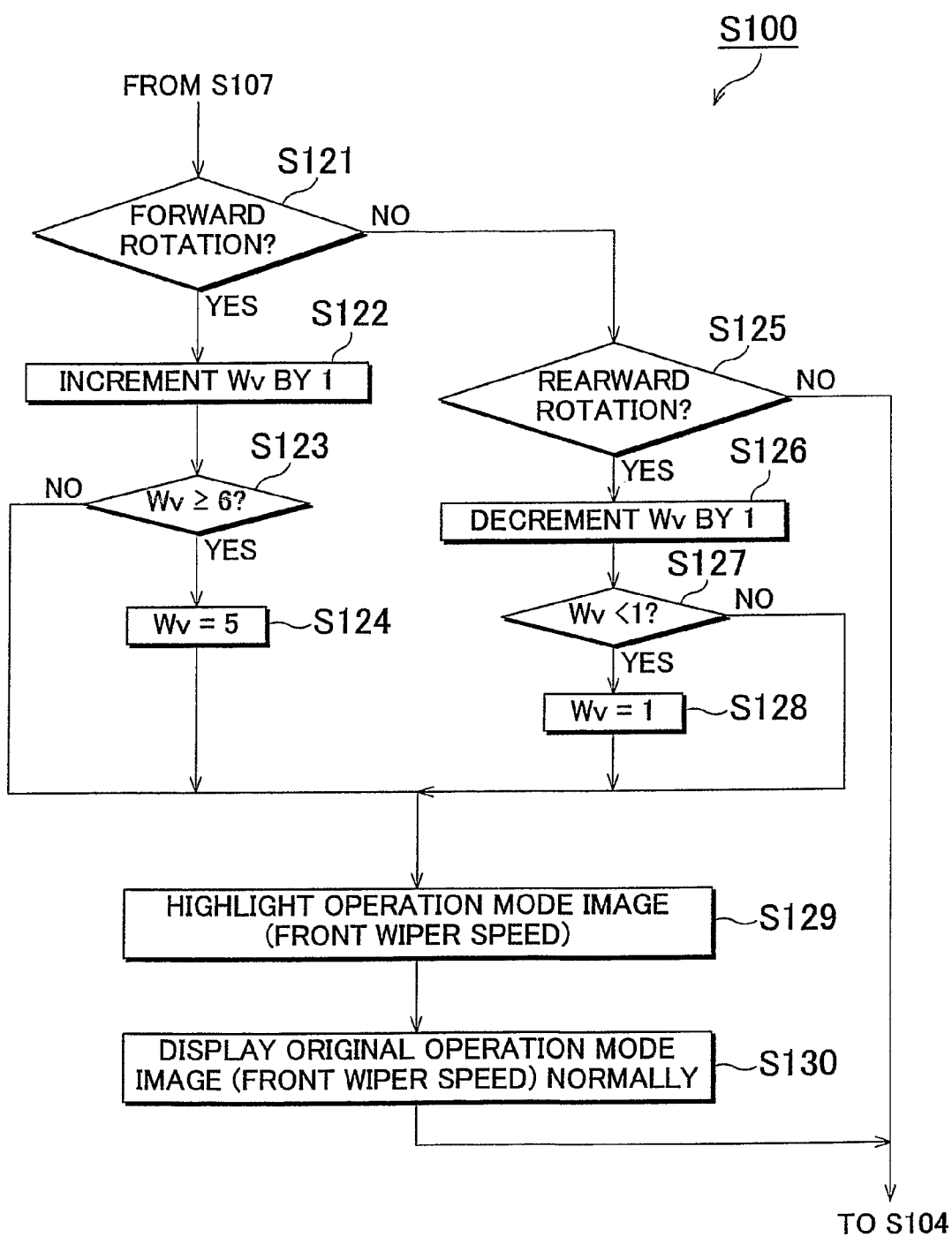
FIG. 13 is a view showing an example of the wiper speed adjustment processing according to the embodiment.

Next, the wiper speed adjustment processing executed by the control unit 102 in the step S100 will be described specifically. FIGS. 12 and 13 are flowcharts showing the specific processing of the wiper speed adjustment processing executed by the control unit 102 in the step S100.

In a step S101, the control unit 102 obtains the front wiper speed value Wv and the rear wiper speed value Rv from the storage unit 103. These values indicate the respective selected operation speeds when the control unit 102 performs the processing of the step S101.

In a step S102, the control unit 102 displays the wiper speed adjustment screen on the display screen of the display unit 104. In a step S103, the control unit 102 specifies the operation modes corresponding to the front wiper speed value Wv and the rear wiper speed value Rv, obtained in the step S101, by referring to the storage table shown in FIG. 3, and instructs the display unit 104 to highlight the respective operation mode images corresponding to the specified operation modes. In a step S104, the control unit 102 specifies another selectable operation subject, i.e. the operation subject corresponding to the position to which the first annular switch Sw1 can slide from its current position, on the basis of the operation subject selected at the time of the processing of the step S104. The control unit 102 then instructs the display unit 104 to display a sliding direction image indicating the direction of the display position of the operation mode image row corresponding to the specified operation subject in relation to the operation mode image row corresponding to the currently selected operation subject. In a step S105, the control unit 102 instructs the display unit 104 to highlight the operation mode image row corresponding to the currently selected operation subject on the basis of the sliding position of the first annular switch Sw1 at the time of the processing of the step S105.

In a step S106, the control unit 102 determines the movement made by the first annular switch Sw1, or in other words the direction in which the first annular switch Sw1 has been rotated or the position to which the first annular switch Sw1 has been caused to slide, and whether the forward rotation signal Fr1 or the rearward rotation signal Rr1 has been generated as a result. After the control unit 102 determines the movement of the first, annular switch Sw1 in the step S106, the processing advances to a step S107. When the control unit 102 determines in the step S106 that the first annular switch Sw1 has not moved, on the other hand, the processing advances to a step S120.

In the step S107, the control unit 102 determines whether or not the first annular switch Sw1 is in the sliding position L1. When the control unit 102 determines in the step S107 that the first annular switch Sw1 is in the sliding position L1, the processing advances to a step S108. When, on the other hand, the control unit 102 determines in the step S107 that the first annular switch Sw1 is not in the sliding position L1, the processing advances to a step S121.

In the step S108, the control unit 102 determines whether or not the forward rotation signal Fr1 has been generated by the first annular switch Sw1, or in other words, whether or not the movement of the first annular switch Sw1 in the step S106 is forward movement. When the control unit 102 determines in the step S108 that the forward rotation signal Fr1 has been generated, or in other words that the first annular switch Sw1 has been rotated once forward, the processing advances to a step S109. On the other hand, when the control unit 102 determines in the step S108 that the forward rotation signal Fr1 has not been generated by the first annular switch Sw1, or in other words that the first annular switch Sw1 has not been rotated forward, the processing advances to a step S112.

In the step S109, the control unit 102 increments the rear wiper speed value Rv stored in the storage unit 103 by 1. In a step S110, the control unit 102 determines whether or not the rear wiper speed value Rv equals or exceeds 6 following the increment of the step S109. When the control unit 102 determines in the step S110 that the rear wiper speed value Rv is equal to or greater than 6, the processing advances to a step S111. When the control unit 102 determines in the step S110 that the rear wiper speed value Rv is not equal to or greater than 6, on the other hand, the processing advances to a step S116.

In the step S111, the control unit 102 updates the rear wiper speed value Rv stored in the storage unit 103 to 5. By performing the processing of the steps S110 and S111, the control unit 102 ensures that the rear wiper speed value Rv does not exceed a maximum value ("5" in the example shown in FIG. 3) listed as a rear wiper speed value in the storage table stored in the storage unit 103 following the increment of the step S109. Thus, the control unit 102 can prevent an operation subject (here, the rear wiper speed) from being operated in an operation mode corresponding to a value that is not listed in the storage table.

In the step S112, the control unit 102 determines whether or not the rearward rotation signal Rr1 has been generated by the first annular switch Sw1, or in other words, whether or not the movement of the first annular switch Sw1 in the step S106 is rearward movement. When the control unit 102 determines in the step S112 that the rearward rotation signal Rr1 has been generated, or in other words that the first annular switch Sw1 has been rotated once rearward, the processing advances to a step S113. On the other hand, when the control unit 102 determines in the step S112 that the rearward rotation signal Rr1 has not been generated by the first annular switch Sw1, or in other words that the first annular switch Sw1 has not been rotated rearward, the processing advances to the step S104.

In the step S113, the control unit 102 decrements the rear wiper speed value Rv stored in the storage unit 103 by 1. In a step S114, the control unit 102 determines whether or not the rear wiper speed value Rv is less than 1 following the decrement performed during the processing of the step S113. When the control unit 102 determines in the step S114 that the rear wiper speed value Rv is less than 1, the processing advances to a step S115. When the control unit 102 determines in the step S114 that the rear wiper speed value Rv is not less than 1, on the other hand, the processing advances to the step S116. In the step S115, the control unit 102 updates the rear wiper speed value Rv stored in the storage unit 103 to 1. By performing the processing of the steps S114 and S115, the control unit 102 ensures that the rear wiper speed value Rv does not fall below a minimum value ("1" in the example shown in FIG. 3) listed as a rear wiper speed value in the storage table following the decrement performed during the processing of the step S113. Thus, the control unit 102 can prevent an operation subject (here, the rear wiper speed) from being operated in an operation mode corresponding to a value that is not stored in the storage table of the storage unit 103.

In the step S116, the control unit 102 instructs the display unit 104 to display the operation mode image of the rear wiper operation speed that was highlighted up to this point normally. In a step S117, the control unit 102 specifies the rear wiper operation speed corresponding to the rear wiper speed value Rv stored in the storage unit 103 by referring to the storage table, and instructs the display unit 104 to highlight all of the operation mode images from the operation mode image displayed at the bottom up to the operation mode image corresponding to the specified rear wiper speed, from among the operation mode images of the rear wiper speed displayed on the display screen of the display unit 104.

In a step S118, the control unit 102 determines whether or not the first annular switch Sw1 has detected contact. When the control unit 102 determines in the step S118 that the first annular switch Sw1 has detected contact, the processing returns to the step S104. When the control unit 102 determines in the step S118 that the first annular switch Sw1 has not detected contact, on the other hand, the processing advances to a step S119. In the step S119, the control unit 102 specifies the operation speed of the front wiper in the AUTO mode and the operation speed of the rear wiper in the INT mode, which correspond respectively to the front wiper speed value Wv and the rear wiper speed value Rv stored in the storage unit 103, by referring to the storage table. When the front wiper is operative in the AUTO mode, the control unit 102 instructs the wiper device 105 to operate the front wiper at the specified operation speed, and when the front wiper is not operative in the AUTO mode, the front wiper speed value Wv is held in the storage unit 103 as is. Further, when the rear wiper is operative in the INT mode, the control unit 102 instructs the wiper device 105 to operate the rear wiper at the specified operation speed, and when the rear wiper is not operative in the INT mode, the rear wiper speed value Rv stored in the storage unit 103 is held in the storage unit 103 as is. In the step S120, the control unit 102 instructs the display unit 104 to delete the display on the display screen of the display unit 104.

Next, referring to a flowchart in FIG. 13, processing performed by the control unit 102 from the step S121 onward will be described. In the step S121, the control unit 102 performs similar processing to that of the step S108. When the control unit 102 determines in the step S121 that the first annular switch Sw1 has been rotated forward, the processing advances to a step S122. When the control unit 102 determines in the step S121 that the first annular switch Sw1 has not been rotated forward, on the other hand, the processing advances to a step S125.

In the step S122, the control unit 102 increments the front wiper speed value Wv stored in the storage unit 103 by 1. In a step S123, the control unit 102 determines whether or not the front wiper speed value Wv equals or exceeds 6 following the increment of the step S122. When the control unit 102 determines in the step S123 that the front wiper speed value Wv is equal to or greater than 6, the processing advances to a step S124. When the control unit 102 determines in the step S123 that the front wiper speed value Wv is not equal to or greater than 6, on the other hand, the processing advances to a step S129.

In the step S124, the control unit 102 updates the front wiper speed value Wv stored in the storage unit 103 to 5. The reason for this is similar to the reason for performing the processing of the steps S110 and S111, described above. In a step S125, the control unit 102 performs similar processing to the step S112. When the control unit 102 determines in the step S125 that the first annular switch Sw1 has been rotated once rearward, the processing advances to a step S126. When the control unit 102 determines in the step S125 that the first annular switch Sw1 has not been rotated rearward, on the other hand, the processing returns to the step S104.

In the step S126, the control unit 102 decrements the front wiper speed value Wv stored in the storage unit 103 by 1. In a step S127, the control unit 102 determines whether or not the front wiper speed value Wv is less than 1 following the decrement of the step S126. When the control unit 102 determines in the step S127 that the front wiper speed value Wv is less than 1, the processing advances to a step S128. When the control unit 102 determines in the step S127 that the front wiper speed value Wv is not less than 1, on the other hand, the processing advances to the step S129. In the step S128, the control unit 102 updates the front wiper speed value Wv stored in the storage unit 103 to 1. The reason for having the control unit 102 perform the processing of the steps S127 and S128 is similar to the reason for performing the processing of the steps S114 and S115, described above.

In the step S129, the control unit 102 instructs the display unit 104 to display the wiper speed-corresponding operation mode images other than the highlighted operation mode images normally. In a step S130, the control unit 102 specifies the front wiper speed corresponding to the front wiper speed value Wv stored in the storage unit 103 by referring to the storage table, and instructs the display unit 104 to highlight all of the operation mode images from the operation mode image displayed at the bottom up to the operation mode image corresponding to the specified front wiper speed, from among the operation mode images of the front wiper speed displayed on the display screen of the display unit 104.

Figure 14:
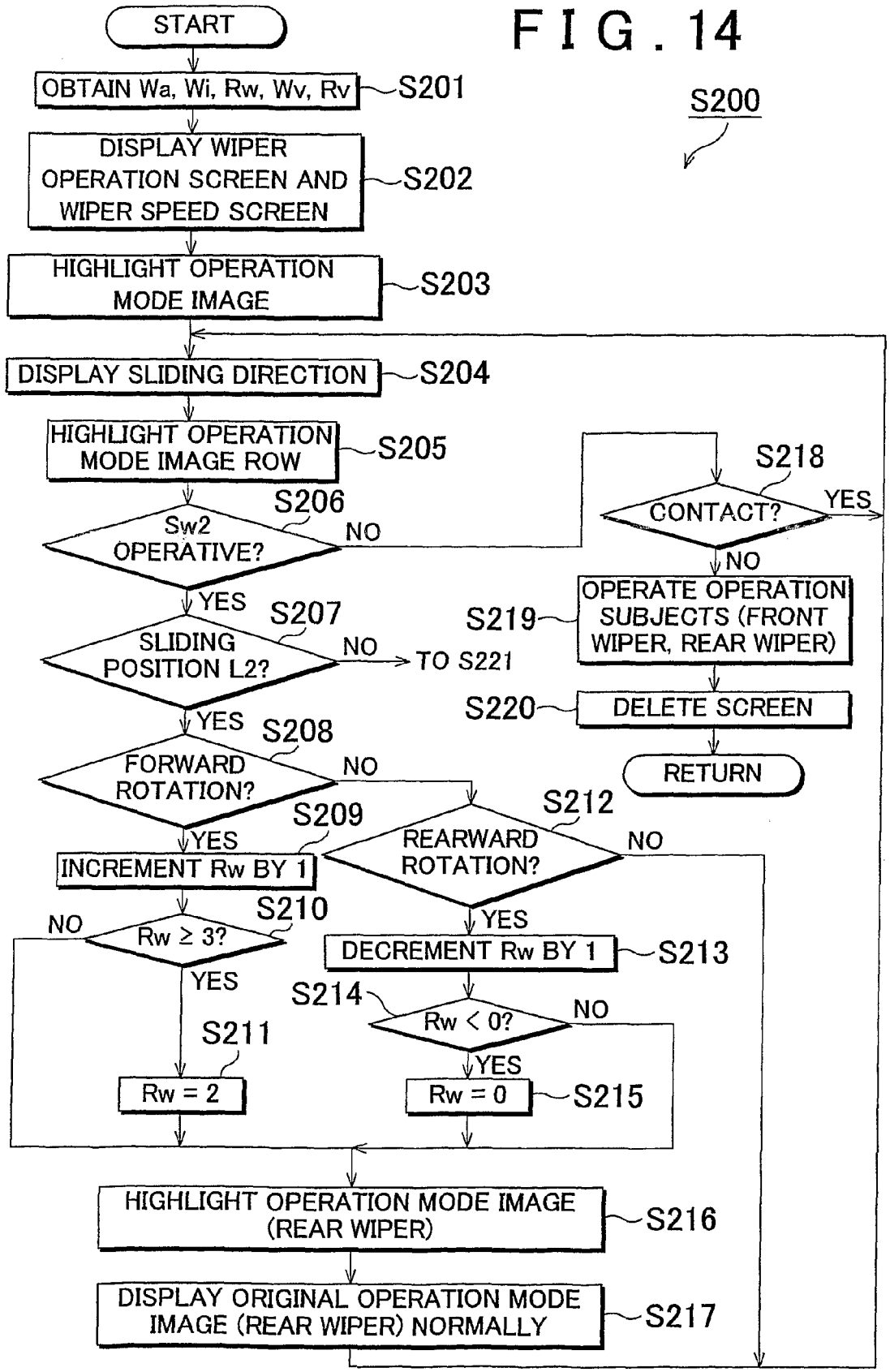
FIG. 14 is a view showing an example of wiper operation processing according to the embodiment.
Figure 15:
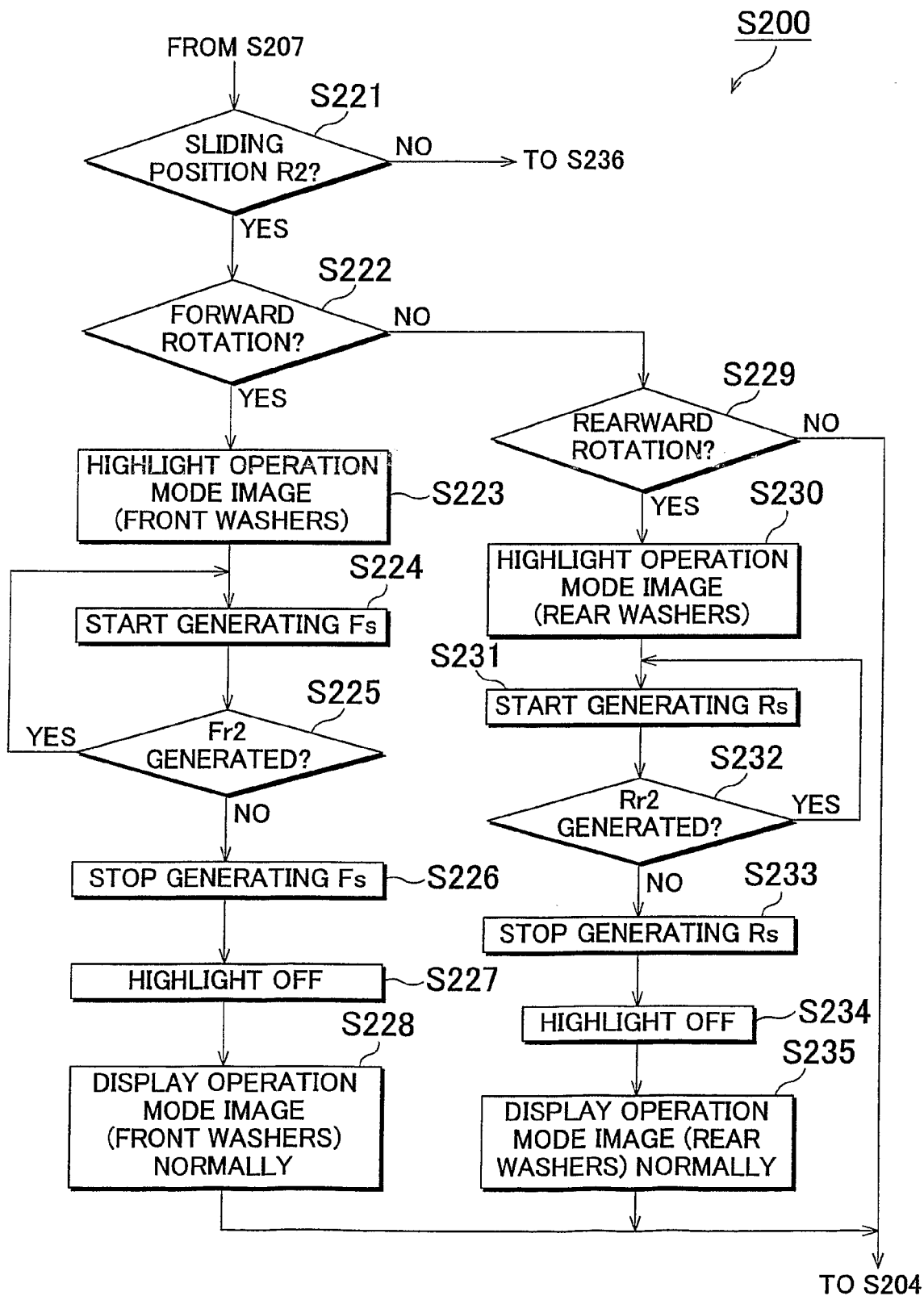
FIG. 15 is a view showing an example of the wiper operation processing according to the embodiment.
Figure 16:
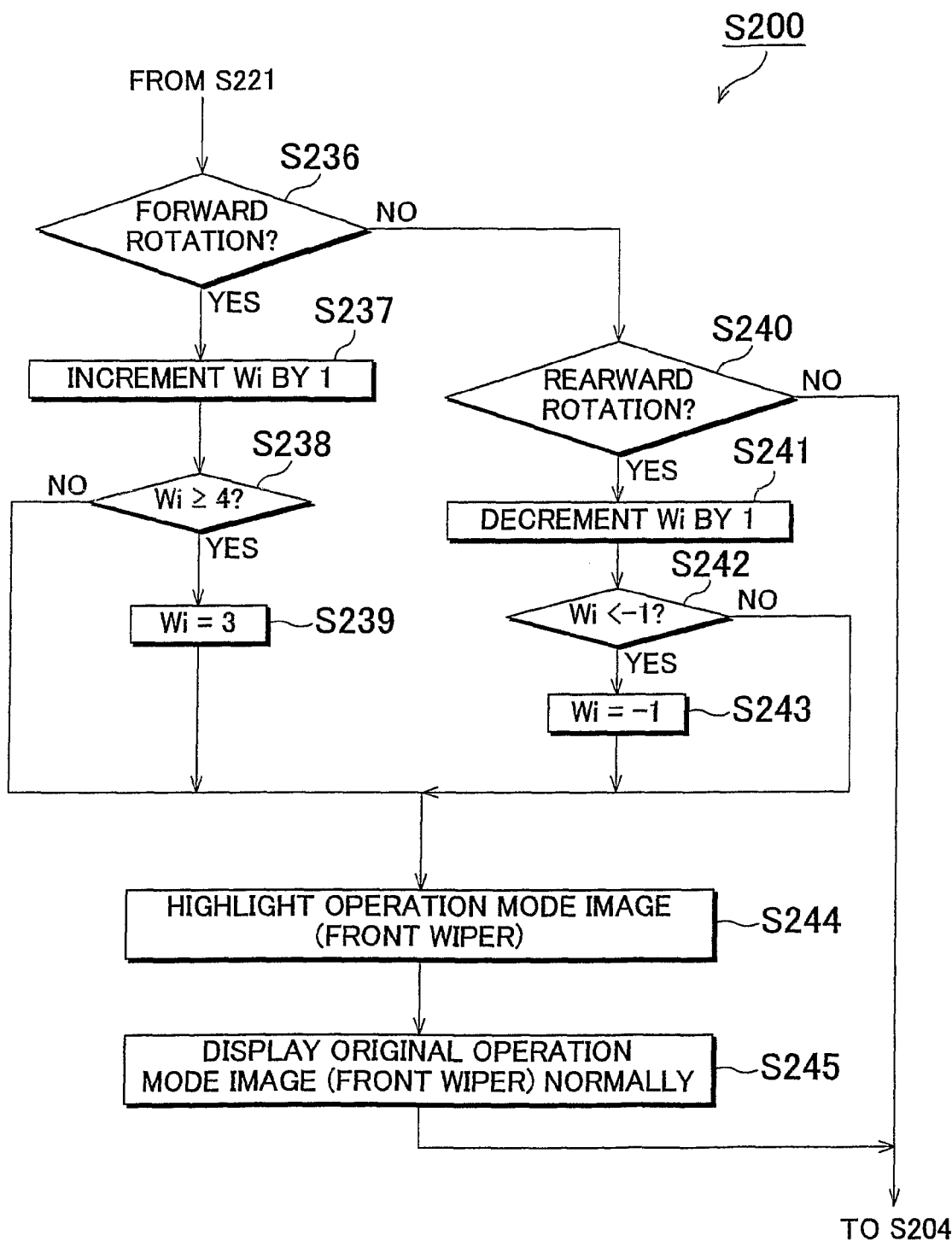
FIG. 16 is a view showing an example of the wiper operation processing according to the embodiment.

Next, the wiper operation processing performed by the control unit 102 will be described in detail. FIGS. 14 to 16 are flowcharts showing specific processing involved in the wiper operation processing of the step S200.

In a step S201, the control unit 102 obtains the washer mode value Wa, the wiper mode value Wi, the rear wiper mode value Rw, the wiper speed value Wv, and the rear wiper speed value Rv, which are stored in the storage unit 103. In a step S202, the control unit 102 displays the wiper operation screen on the display unit 104. Further, it is assumed in this embodiment that in the step S202, the wiper speed screen is displayed together with the wiper operation screen in the operation screen display region of the display screen of the display unit 104, as described above.

In a step S203, the control unit 102 specifies the operation modes of the operation subjects corresponding respectively to the values obtained in the step S201 by referring to the storage table, and instructs the display unit 104 to highlight the respective operation mode images corresponding to the specified operation mode values. In a step S204, the control unit 102 performs similar processing to that of the step S104 on the basis of the selected operation subject at the time of the step S204, or in other words the sliding position of the second annular switch Sw2, and then instructs the display unit 104 to display the sliding direction image on the display screen of the display unit 104. In a step S205, the control unit 102 specifies the currently selected operation subject on the basis of the sliding position of the second annular switch Sw2 at the time of the processing of the step S205, and instructs the display unit 104 to highlight the operation mode image row corresponding to the specified operation subject.

In a step S206, the control unit 102 performs a similar determination to that of the step S106 in relation to the second annular switch Sw2. When the control unit 102 determines in the step S206 that the second annular switch Sw2 has moved, the processing advances to a step S207. When the control unit 102 determines in the step S206 that the second annular switch Sw2 has not moved, on the other hand, the processing advances to a step S218.

In the step S207, the control unit 102 determines whether or not the second annular switch Sw2 is in the sliding position L2. When the control unit 102 determines in the step S207 that the second annular switch Sw2 is in the sliding position L2, the processing advances to a step S208. When the control unit 102 determines in the step S207 that the second annular switch Sw2 is not in the sliding position L2, on the other hand, the processing advances to a step S221.

In the step S208, the control unit 102 determines whether or not the forward rotation signal Fr2 has been generated by the second annular switch Sw2, or in other words, whether or not the movement of the second annular switch Sw2 in the step S206 is forward movement. When the control unit 102 determines in the step S208 that the forward rotation signal Fr2 has been generated, or in other words that the second annular switch Sw2 has been rotated once forward, the processing advances to a step S209. On the other hand, when the control unit 102 determines in the step S208 that the forward rotation signal Fr2 has not been generated by the second annular switch Sw2, or in other words that the second annular switch Sw2 has not been rotated forward, the processing advances to a step S212.

In the step S209, the control unit 102 increments the rear wiper mode value Rw stored in the storage unit 103 by 1. In a step S210, the control unit 102 determines whether or not the rear wiper mode value Rw equals or exceeds 3 following the increment of the step S209. When the control unit 102 determines in the step S210 that the rear wiper mode value Rw is equal to or greater than 3, the processing advances to a step S211. When the control unit 102 determines in the step S210 that the rear wiper mode value Rw is not equal to or greater than 3, on the other hand, the processing advances to a step S216.

In the step S211, the control unit 102 updates the rear wiper mode value Rw stored in the storage unit 103 to 2. By performing the processing of the steps S210 and S211, the control unit 102 ensures that the rear wiper mode value Rw does not exceed a maximum value stored as a rear wiper mode value in the storage table following the increment performed during the processing of the step S209.

In the step S212, the control unit 102 determines whether or not the rearward rotation signal Rr2 has been generated by the second annular switch Sw2, or in other words, whether or not the movement of the second annular switch Sw2 in the step S206 is rearward movement. When the control unit 102 determines in the step S212 that the rearward rotation signal Rr2 has been generated, or in other words that the second annular switch Sw2 has been rotated once rearward, the processing advances to a step S213. On the other hand, when the control unit 102 determines in the step S212 that the rearward rotation signal Rr2 has not been generated by the second annular switch Sw2, or in other words that the second annular switch Sw2 has not been rotated rearward, the processing advances to the step S218.

In the step S213, the control unit 102 decrements the rear wiper mode value Rw stored in the storage unit 103 by 1. In a step S214, the control unit 102 determines whether or not the rear wiper mode value Rw is less than zero following the decrement performed in the processing of the step S213. When the control unit 102 determines in the step S214 that the rear wiper mode value Rw is less than zero, the processing advances to a step S215. When the control unit 102 determines in the step S214 that the rear wiper mode value Rw is not less than zero, on the other hand, the processing advances to the step S216. In the step S215, the control unit 102 updates the rear wiper mode value Rw stored in the storage unit 103 to zero. By performing the processing of the steps S214 and S215, the control unit 102 ensures that the rear wiper mode value Rw does not fall below a minimum value stored as a rear wiper mode value in the storage table following the decrement performed during the processing of the step S213.

In the step S216, the control unit 102 specifies the rear wiper operation mode corresponding to the rear wiper mode value Rw stored in the storage unit 103 by referring to the storage table, and instructs the display unit 104 to highlight the operation mode image corresponding to the specified rear wiper operation mode. In a step S217, the control unit 102 instructs the display unit 104 to display the operation mode image corresponding to the rear wiper operation mode highlighted before the processing of the step S216 normally.

In the step S218, the control unit 102 determines whether or not the second annular switch Sw2 has detected contact. When the control unit 102 determines in the step S218 that the second annular switch Sw2 has detected contact, the processing returns to the step S204. When, on the other hand, the control unit 102 determines in the step S218 that the second annular switch Sw2 has not detected contact, the processing advances to a step S219. In the step S219, the control unit 102 specifies the front wiper and rear wiper operation modes corresponding respectively to the wiper mode value Wi and rear wiper mode value Rw generated by the second annular switch Sw2 by referring to the storage table, and instructs the wiper device 105 to operate the front wiper and rear wiper in the specified operation modes. When the front wiper operation mode is the AUTO mode, the control unit 102 also instructs the wiper device 105 to operate the front wiper at the front wiper speed corresponding to the front wiper speed value Wv. Further, when the rear wiper operation mode is the INT mode, the control unit 102 also instructs the wiper device 105 to operate the rear wiper at the rear wiper speed value corresponding to the rear wiper speed value Rv. In a step S220, the control unit 102 instructs the display unit 104 to delete the display on the display screen of the display unit 104.

Next, referring to FIG. 15, the processing performed by the control unit 102 from the step S221 onward will be described. In the step S221, the control unit 102 determines whether or not the second annular switch Sw2 has been slid to the sliding position R2. When the control unit 102 determines in the step S221 that the second annular switch Sw2 has been slid to the sliding position R2, the processing advances to a step S222. When the control unit 102 determines in the step S221 that the second annular switch Sw2 has not been slid to the sliding position R2, on the other hand, the processing advances to a step S236.

In the step S222, the control unit 102 performs similar processing to that of the step S208. When the control unit 102 determines in the step S222 that the second annular switch Sw2 has been rotated forward, the processing advances to a step S223. When the control unit 102 determines that the second annular switch Sw2 has not been rotated forward in the Step S222, on the other hand, the processing advances to a step S229.

In the step S223, the control unit 102 instructs the display unit 104 to highlight the operation mode image corresponding to front washer On. Further, in the step S223, the control unit 102 instructs the display unit 104 to display the operation mode image corresponding to washer Off normally. In a step S224, the control unit 102 generates a front washer signal Fs. It is assumed that in this embodiment, the washer function included in the wiper device 105 activates the front washer for the entire generation period of the front washer signal Fs generated by the control unit 102 after the front washer signal Fs has been obtained.

In a step S225, the control unit 102 determines whether or not the forward rotation signal Fr2 has been generated. When the control unit 102 determines in the step S225 that the forward rotation signal Fr2 has been generated, the processing returns to the step S224. When the control unit 102 determines in the step S225 that the forward rotation signal Fr2 has not been generated, on the other hand, the processing advances to a step S226.

In the step S226, the control unit 102 halts generation of the front washer signal Fs. In a step S227, the control unit 102 instructs the display unit 104 to highlight the operation mode image corresponding to washer Off. In a step S228, the control unit 102 instructs the display unit 104 to display the operation mode image corresponding to front washer On normally. By having the control unit 102 perform the processing of the steps S222 to S228, the front washer is activated, and the operation mode image corresponding to front washer On is highlighted, for a period corresponding to the period during which the second annular switch Sw2 is rotated forward in the sliding position R2.

In a step S229, the control unit 102 performs similar processing to that of the step S212. When the control unit 102 determines in the step S229 that the second annular switch Sw2 has been rotated rearward, the processing advances to a step S230. When, on the other hand, the control unit 102 determines in the step S229 that the second annular switch Sw2 has not been rotated rearward, the processing returns to the step S204.

In the step S230, the control unit 102 instructs the display unit 104 to highlight the operation mode image corresponding to rear washer On. Further, in the step S230, the control unit 102 instructs the display unit 104 to display the operation mode image corresponding to washer Off normally. In a step S231, the control unit 102 generates a rear washer signal Rs. It is assumed that in this embodiment, the washer function included in the wiper device 105 activates the rear washer for the entire generation period of the rear washer signal Rs generated by the control unit 102 after the rear washer signal Rs has been obtained, similarly to the case in which the front washer signal Fs is generated.

In a step S232, the control unit 102 determines whether or not the rearward rotation signal Rr2 has been generated. When the control unit 102 determines in the step S232 that the rearward rotation signal Rr2 has been generated, the processing returns to the step S231. When the control unit 102 determines in the step S232 that the rearward rotation signal Rr2 has not been generated, on the other hand, the processing advances to a step S233.

In the step S233, the control unit 102 halts generation of the rear washer signal Rs. In a step S234, the control unit 102 instructs the display unit 104 to highlight the operation mode image corresponding to washer Off. In a step S235, the control unit 102 instructs the display unit 104 to display the operation mode image corresponding to rear washer On normally. By having the control unit 102 perform the processing of the steps S229 to S235, the rear washer is activated, and the operation mode image corresponding to rear washer On is highlighted, for a period corresponding to the period during which the second annular switch Sw2 is rotated rearward in the sliding position R2.

Next, referring to a flowchart in FIG. 16, the processing performed by the control unit 102 from the step S236 onward will be described. In the step S236, the control unit 102 performs similar processing to that of the step S208. When the control unit 102 determines in the step S236 that the second annular switch Sw2 has been rotated forward, the processing advances to a step S237. When, on the other hand, the control unit 102 determines in the step S236 that the second annular switch Sw2 has not been rotated forward, the processing advances to a step S240.

In the step S237, the control unit 102 increments the front wiper mode value Wi stored in the storage unit 103 by 1. In a step S238, the control unit 102 determines whether or not the front wiper mode value Wi equals or exceeds 4 following the increment of the step S237. When the control unit 102 determines in the step S238 that the front wiper mode value Wi is equal to or greater than 4, the processing advances to a step S239. When the control unit 102 determines in the step S238 that the front wiper mode value Wi is not equal to or greater than 4, on the other hand, the processing advances to a step S244. In the step S239, the control unit 102 updates the front wiper mode value Wi stored in the storage unit 103 to 3. The reason for having the control unit 102 perform the processing of the steps S238 and S239 is similar to the reason for performing the processing of the step S210 and S211, described above.

In the step S240, the control unit 102 performs similar processing to that of the step S212. When the control unit 102 determines in the step S240 that the second annular switch Sw2 has been rotated rearward, the processing advances to a step S241. When, on the other hand, the control unit 102 determines in the step S240 that the second annular switch Sw2 has not been rotated rearward, the processing returns to the step S204.

In the step S241, the control unit 102 decrements the front wiper mode value Wi stored in the storage unit 103 by 1. In a step S242, the control unit 102 determines whether or not the front wiper mode value Wi is less than −1 following the decrement of the step S241. When the control unit 102 determines in the step S242 that the front wiper mode value Wi is less than −1, the processing advances to a step S243. When, on the other hand, the control unit 102 determines in the step S242 that the front wiper mode value Wi is not less than −1, the processing advances to the step S244.

Figure 17:
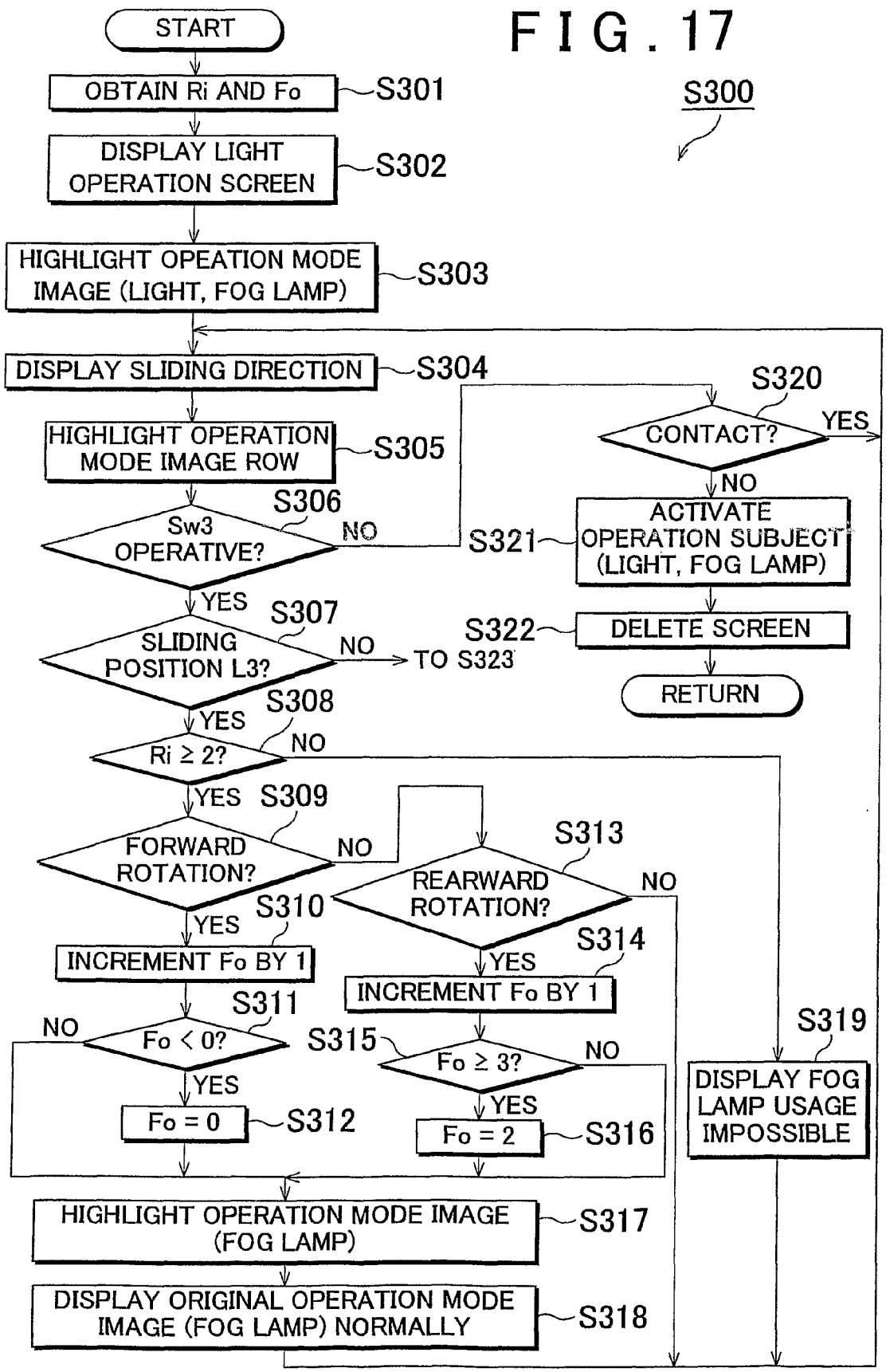
FIG. 17 is a view showing an example of light operation processing according to the embodiment.
Figure 18:
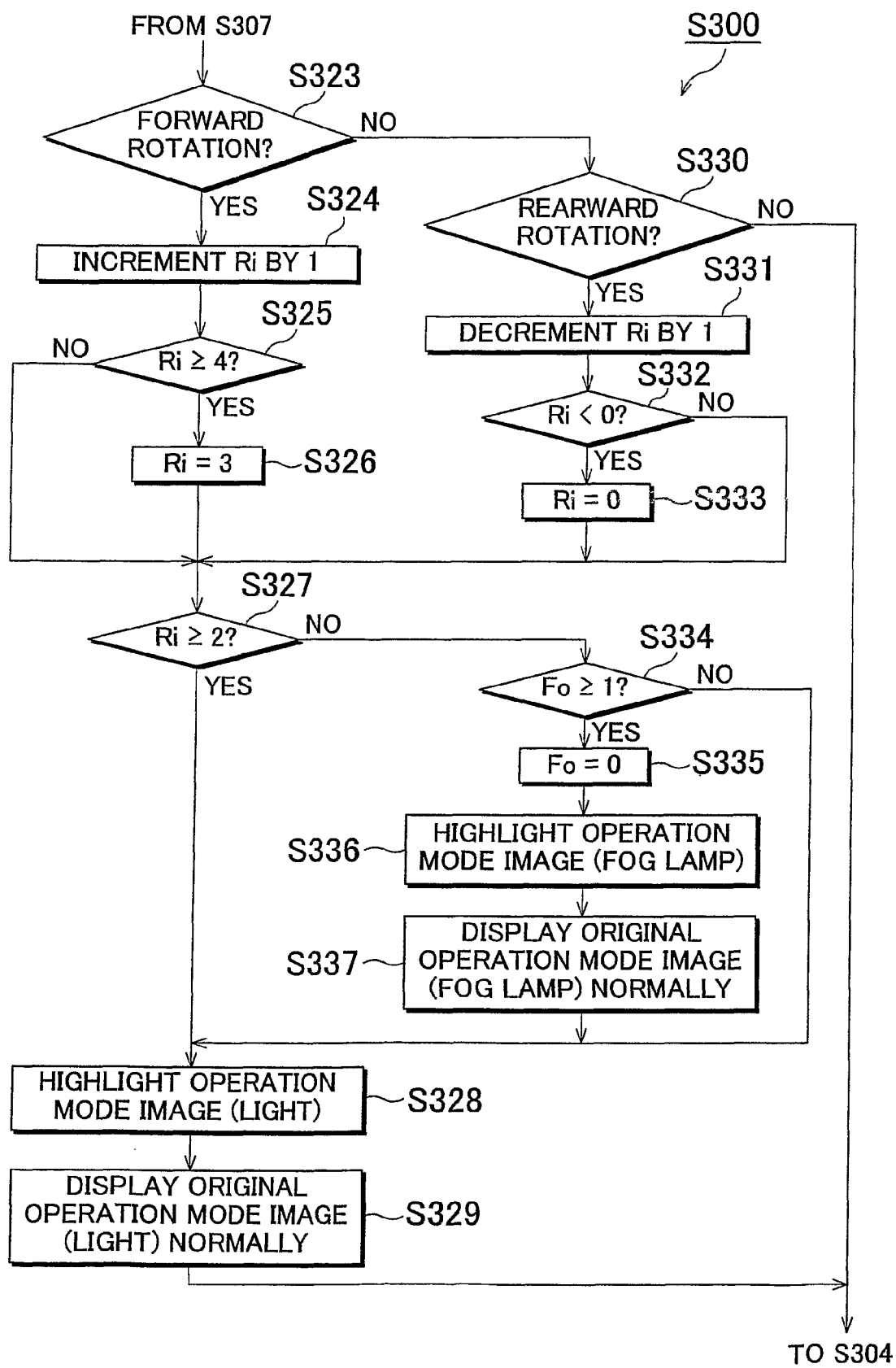
FIG. 18 is a view showing an example of the light operation processing according to the embodiment.

Next, light operation processing performed by the control unit 102 will be described in detail. FIGS. 17 and 18 are flowcharts showing specific processing of the light operation processing performed in the step S300.

In a step S301, the control unit 102 obtains the light mode value Ri and the fog mode value Fo stored in the storage unit 103. In a step S302, the control unit 102 displays the light operation screen on the display screen of the display unit 104. In a step S303, the control unit 102 specifies the operation modes corresponding to the light mode value Ri and fog mode value Fo obtained in the step S301 by referring to the storage table, and instructs the display unit 104 to highlight the respective operation mode images corresponding to the specified operation modes. In a step S304, the control unit 102 performs similar processing to that of the step S104 on the basis of the sliding position of the third annular switch Sw3 at the time of the processing of the step S304, and then instructs the display unit 104 to display the sliding direction image described above. In a step S305, the control unit 102 instructs the display unit 104 to highlight the operation mode image row corresponding to the currently selected operation subject on the basis of the sliding position of the third annular switch Sw3 at the time of the processing of the step S305.

In a step S306, the control unit 102 performs a similar determination to that of the step S106 in relation to the third annular switch Sw3. When the control unit 102 determines in the step S306 that the third annular switch Sw3 has moved, the processing advances to a step S307. When the control unit 102 determines in the step S306 that the third annular switch Sw3 has not moved, on the other hand, the processing advances to a step S320.

In the step S307, the control unit 102 determines whether or not the third annular switch Sw3 is in the sliding position L3. When the control unit 102 determines in the step S307 that the third annular switch Sw3 is in the sliding position 13, the processing advances to a step S308. When the control unit 102 determines in the step S307 that the third annular switch Sw3 is not in the sliding position L3, on the other hand, the processing advances to a step S323.

In the step S308, the control unit 102 determines whether or not the light mode value Ri is equal to or greater than 2. When the control unit 102 determines in the step S308 that the light mode value Ri is equal to or greater than 2, the processing advances to a step S309. When, on the other hand, the control unit 102 determines in the step S308 that the light mode value Ri is not equal to or greater than 2, the processing advances to a step S319.

In the step S309, the control unit 102 determines whether or not the forward rotation signal Fr3 has been generated by the third annular switch Sw3, or in other words, whether or not the movement of the third annular switch Sw3 in the step S306 is forward movement. When the control unit 102 determines in the step S309 that the forward rotation signal Fr3 has been generated, or in other words that the third annular switch Sw3 has been rotated once forward, the processing advances to a step S310. On the other hand; when the control unit 102 determines in the step S309 that the forward rotation signal Fr3 has not been generated by the third annular switch Sw3, or in other words that the third annular switch Sw3 has not been rotated forward, the processing advances to a step S313.

In the step S310, the control unit 102 decrements the fog mode value Fo stored in the storage unit 103 by 1. In a step S311, the control unit 102 determines whether or not the fog mode value Fo is less than zero following the decrement of the step S310. When the control unit 102 determines in the step S311 that the fog mode value Fo is less than zero, the processing advances to a step S312. When the control unit 102 determines in the step S311 that the fog mode value Fo is not less than zero, on the other hand, the processing advances to a step S317.

In the step S312, the control unit 102 updates the fog mode value Fo stored in the storage unit 103 to zero. The reason for having the control unit 102 perform the processing of the steps S311 and S312 is similar to the reason for performing the processing of the steps S114 and S115 for the fog mode value Fo, described above.

In the step S313, the control unit 102 determines whether or not the rearward rotation signal Rr3 has been generated by the third annular switch Sw3, or in other words, whether or not the movement of the third annular switch Sw3 in the step S306 is rearward movement. When the control unit 102 determines in the step S313 that the rearward rotation signal Rr3 has been generated, or in other words that the third annular switch Sw3 has been rotated once rearward, the processing advances to a step S314. On the other hand, when the control unit 102 determines in the step S313 that the rearward rotation signal Rr3 has not been generated by the third annular switch Sw3, or in other words that the third annular switch Sw3 has not been rotated rearward, the processing returns to the step S304.

In the step S314, the control unit 102 increments the fog mode value Fo stored in the storage unit 103 by 1. In a step S315, the control unit 102 determines whether or not the fog mode value Fo is equal to or greater than 3 following the increment performed in the processing of the step S314. When the control unit 102 determines in the step S315 that the fog mode value Fo is equal to or greater than 3, the processing advances to a step S316. When the control unit 102 determines in the step S315 that the fog mode value Fo is not equal to or greater than 3, on the other hand, the processing advances to the step S317.

In the step S316, the control unit 102 updates the fog mode value Fo stored in the storage unit 103 to 2. The reason for having the control unit 102 perform the processing of the steps S315 and S316 is similar to the reason for performing the processing of the steps S110 and S111, albeit in relation to the fog mode value Fo.

In the step S317, the control unit 102 specifies the fog lamp operation mode corresponding to the fog mode value Fo stored in the storage unit 103 by referring to the storage table, and instructs the display unit 104 to highlight the operation mode image corresponding to the specified fog lamp operation mode. In a step S318, the control unit 102 instructs the display unit 104 to display the fog lamp operation mode image that was highlighted immediately before the processing of the step S317 normally.

In the step S319, the control unit 102 instructs the display unit 104 to display a fog lamp unusable screen, which indicates that the fog lamp cannot be used in at least one of alphabetic characters and patterns, on the display screen of the display unit 104.

In the step S320, the control unit 102 performs similar processing to that of the step S118 in relation to the third annular switch Sw3. When the control unit 102 determines in the step S320 that the third annular switch Sw3 has detected contact, the processing returns to the step S304. When, on the other hand, the control unit 102 determines in the step S320 that the third annular switch Sw3 has not detected contact, the processing advances to a step S321.

In the step S321, the control unit 102 specifies the operation modes corresponding respectively to the fog mode value Fo stored in the storage unit 103 and the light mode value Ri generated by the third annular switch Sw3 by referring to the storage table, and instructs the light device 106 to operate the fog lamp and light in the specified operation modes. In a step S322, the control unit 102 performs similar processing to that of the step S120.

Next, referring to a flowchart in FIG. 18, the processing performed by the control unit 102 from the step S323 onward will be described. In the step S323, the control unit 102 performs similar processing to that of the step S309. When the control unit 102 determines in the step S323 that the third annular switch Sw3 has been rotated forward, the processing advances to a step S324. When, on the other hand, the control unit 102 determines in the step S323 that the third annular switch Sw3 has not been rotated forward, the processing advances to a step S330.

In the step S324, the control unit 102 increments the light mode value Ri stored in the storage unit 103 by 1. In a step S325, the control unit 102 determines whether or not the light mode value Ri equals or exceeds 4 following the increment of the step S324. When the control unit 102 determines in the step S325 that the light mode value Ri is equal to or greater than 4, the processing advances to a step S326. When the control unit 102 determines in the step S325 that the light mode value Ri is not equal to or greater than 4, on the other hand, the processing advances to a step S327. In the step S326, the control unit 102 updates the light mode value Ri stored in the storage unit 103 to 3. The reason for having the control unit 102 perform the processing of the steps S325 and S326 is similar to the reason for performing the processing of the step S110 and S111, described above.

In the step S327, the control unit 102 determines whether or not the light mode value Ri stored in the storage unit 103 is equal to or greater than 2. When the control unit 102 determines in the step S327 that the light mode value Ri is equal to or greater than 2, the processing advances to a step S328. When the control unit 102 determines in the step S327 that the light mode value Ri is not equal to or greater than 2, on the other hand, the processing advances to a step S334.

In the step S328, the control unit 102 specifies the light operation mode corresponding to the light mode value Ri stored in the storage unit 103 by referring to the storage table, and instructs the display unit 104 to highlight the operation mode image corresponding to the specified operation mode. In a step S329, the control unit 102 performs similar processing to that of the step S318 in relation to the operation mode image corresponding to the light operation mode.

In a step S330, the control unit 102 performs similar processing to that of the step S313. When the control unit 102 determines in the step S330 that the third annular switch Sw3 has been rotated rearward, the processing advances to a step S331. When, on the other hand, the control unit 102 determines in the step S330 that the third annular switch Sw3 has not been rotated rearward, the processing returns to the step S304.

In the step S331, the control unit 102 decrements the light mode value Ri stored in the storage unit 103 by 1. In a step S332, the control unit 102 determines whether or not the light mode value Ri is less than 0 following the decrement of the step S331. When the control unit 102 determines that the light mode value Ri is less than 0, the processing advances to a step S333, and when the control unit 102 determines that the light mode value Ri decremented in the step S331 is not less than 0, the processing advances to the step S327.

In a step S334, the control unit 102 determines whether or not the fog mode value Fo stored in the storage unit 103 is equal to or greater than 1. When the control unit 102 determines in the step 334 that the fog mode value Fo is equal to or greater than 1, the processing advances to a step S335. When, on the other hand, the control unit 102 determines in the step S334 that the fog mode value Fo is not equal to or greater than 1, the processing advances to the step S328.

In the step S335, the control unit 102 updates the fog mode value Fo stored in the storage unit 103 to 0. In a step S336, the control unit 102 instructs the display unit 104 to highlight the operation mode image corresponding to the fog lamp Off operation mode. In a step S337, the control unit 102 instructs the display unit 104 to display the fog lamp operation mode image that was highlighted immediately before the processing of the step S336 normally.

Figure 19:
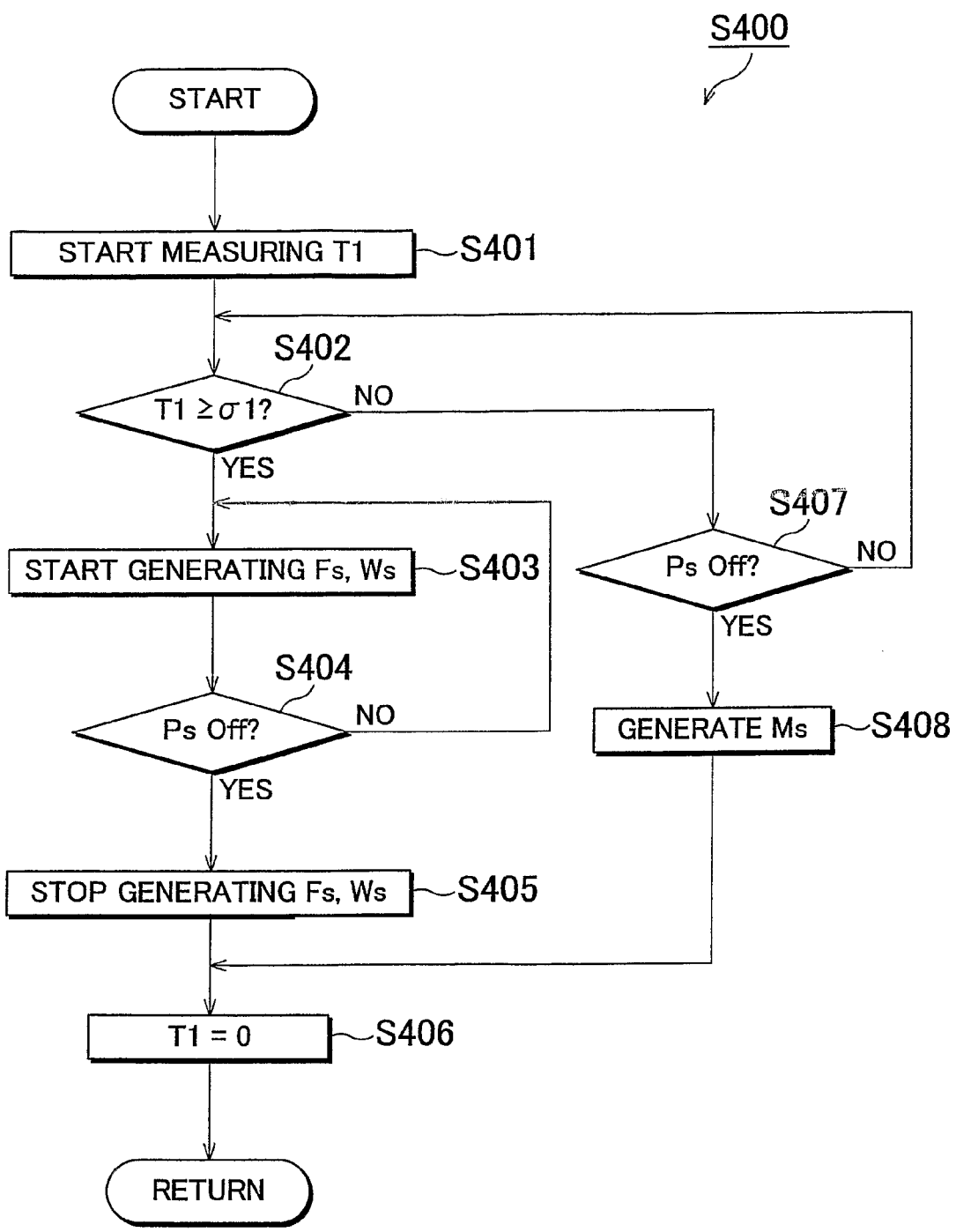
FIG. 19 is a view showing an example of push-in switch processing according to the embodiment.

Next, the push-in switch processing performed by the control unit 102 in a step S400 will be described in detail. FIG. 19 is a flowchart showing specific processing of the push-in switch processing performed by the control unit 102 in the step S400. When a time period T1 extending from a point at which the push-in switch Ps switches On to a point at which the push-in switch Ps subsequently switches Off is equal to or smaller than a predetermined threshold σ1, the control unit 102 according to this embodiment instructs the wiper device 105 to perform a wiper MIST operation in which the front wiper performs a single reciprocating motion. On the other hand, when the push-in switch Ps switches On and subsequently switches Off after the time period T1 exceeds the threshold σ1, the control unit 102 according to this embodiment instructs the wiper device 105 to operate the front washer and the front wiper for the entire time period from the point at which the time period T1 exceeds the threshold σ1 to the point at which the push-in switch subsequently switches Off.

In this embodiment, the operation modes of the respective operation subjects can be selected while viewing the screen, and the respective operation subjects can be operated in the selected operation modes when the touch sensors (annular switches) cease to detect contact. On the other hand, when the user wishes to secure his/her field of vision quickly by cleaning the windshield or the like, s/he can perform a preparatory operation to select the operation mode while viewing the screen and operate at least one of the front wiper and front washer immediately, without releasing contact with the touch sensor, by having the control unit 102 perform processing such as that shown in FIG. 19. The flowchart shown in FIG. 19 is a flowchart for causing the control unit 102 to execute this processing.

In a step S401, the control unit 102 starts to measure the time period T1 from the point at which the push-in switch Ps switches On to the point at which the push-in switch Ps subsequently switches Off. In a step S402, the control unit 102 determines whether or not the time period T1 is equal to or greater than the predetermined threshold σ1. When the control unit 102 determines in the step S402 that the time period T1 is equal to or greater than the predetermined threshold a1, the processing advances to a step S403. When, on the other hand, the control unit 102 determines in the step S402 that the time period T1 is not equal to or greater than the predetermined threshold a1, the processing advances to a step S407.

In the step S403, the control unit 102 starts to generate the front washer signal Fs and a front wiper signal Ws. In a step S404, the control unit 102 determines whether or not the push-in switch Ps has been switched Off. When the control unit 102 determines in the step S404 that the push-in switch Ps has been switched Off, the processing advances to a step S405. When, on the other hand, the control unit 102 determines in the step S404 that the push-in switch Ps has not been switched Off, the processing returns to the step S403. It is assumed in this embodiment that the wiper device 105 operates the front wiper over the entire generation period of the front wiper signal Ws.

In the step S405, the control unit 102 halts generation of the front washer signal Fs and the front wiper signal Ws. In a step S406, the control unit 102 resets the time period T1 to zero.

In a step S407, the control unit 102 determines whether or not the push-in switch Ps has been switched Off. When the control unit 102 determines in the step S407 that the push-in switch Ps has been switched Off, the processing advances to a step S408. When, on the other hand, the control unit 102 determines in the step S407 that the push-in switch Ps has not been switched Off, the processing returns to the step S402. In the step S408, the control unit 102 generates a wiper MIST signal Ms a single time.

First Modified Example

In the embodiment described above, the display screen of the display unit 104 invariably changes when the user touches one of the first to third annular switches (touch sensors) Sw1 to Sw3, regardless of the lightness of the touch. However, operations performed by the user during travel include operations for which there is no need to check the screen, such as a turn signal operation for operating the turn signal. Therefore, if the screen changes when the user performs such an operation, flickering resulting from the unnecessary screen change causes the user to experience an unpleasant sensation. A flowchart shown in FIG. 20, which is a modification of the flowchart in FIG. 11, is a flowchart for causing the control unit 102 to execute processing to ensure that the screen does not change unnecessarily when the user performs an operation for which there is no need to check the screen such that one of the first to third annular switches Sw1 to Sw3 detects contact. Note that the constitution of the operating device according to the first modified example is identical to the constitution of the operating device 10 described above, and hence description thereof has been omitted. Further, identical reference symbols have been allocated to processing in the flowchart of FIG. 20, according to this modified example, which is identical to the processing of the flowchart of FIG. 11 according to the embodiment, and description thereof has been omitted.

In a step S51, the control unit 102 determines whether or not one of the first to third annular switches Sw1 to Sw3 has detected contact so as to switch On. When the control unit 102 determines in the step S51 that one of the switches is On, the processing advances to a step S53. On the other hand, when the control unit 102 determines in the step S51 that none of the switches is On, the processing advances to the step S14.

In a step S52, the control unit 102 begins to measure a time period T2 extending from the point at which one of the first to third annular switches Sw1 to Sw3 switches On to the point at which the switch subsequently switches Off. In the step S53, the control unit 102 determines whether or not the time period T2 is equal to or greater than a predetermined threshold σ2. When the control unit 102 determines in the step S53 that the time period T2 is equal to or greater than the predetermined threshold σ2, the processing advances to the step S11. On the other hand, when the control unit 102 determines in the step S53 that the time period T2 is not equal to or greater than the predetermined threshold σ2, the processing advances to a step S54.

In the step S54, the control unit 102 determines whether or not the switch that detected contact in the step S51 has ceased to detect contact. When the control unit 102 determines in the step S54 that the switch that detected contact in the step S51 has ceased to detect contact, the processing advances to a step S55. On the other hand, when the control unit 102 determines in the step S54 that the switch that detected contact in the step S51 still detects contact, the processing returns to the step S53. In the step S55, the control unit 102 resets the time period T2 to zero.

Figure 20:
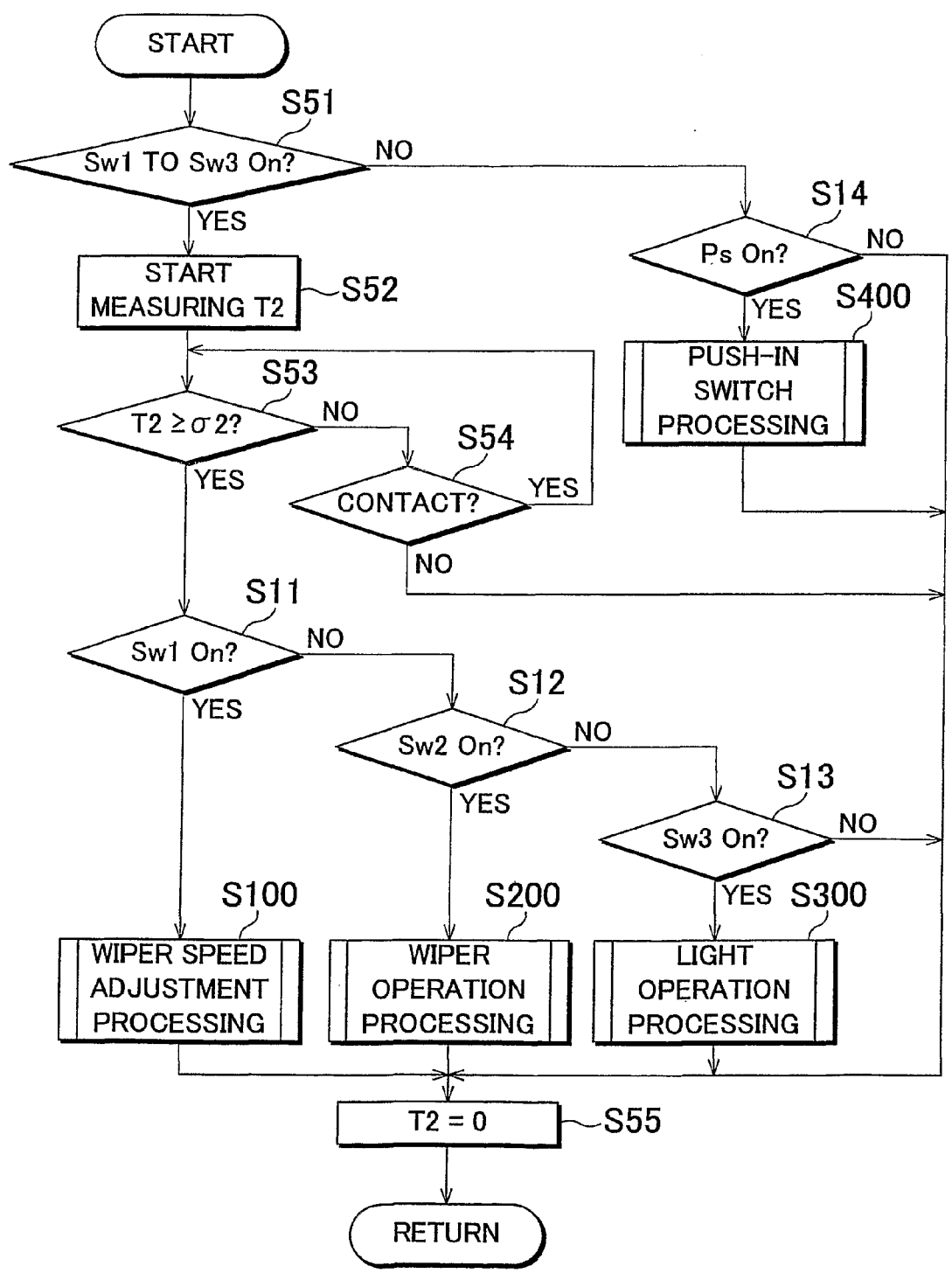
FIG. 20 is a view showing processing of a control unit according to a first modified example of the embodiment.

By having the control unit 102 perform the processing of the flowchart shown in FIG. 20, the display on the display unit 104 does not change unless one of the first to third annular switches Sw1 to Sw3 detects contact for a time period equal to or greater than the predetermined threshold σ2 (unless a continuous operation time of the switch equals or exceeds the threshold σ2). In other words, by having the control unit 102 perform the processing of the flowchart shown in FIG. 20, situations in which flickering resulting from an unnecessary screen change causes the user to experience an unpleasant sensation can be prevented.

Second Modified Example

In the operating device 10 according to the embodiment described above, wiper speed adjustment and a wiper operation are performed using different switches. In the operating device 10 according to the second modified example, in contrast, wiper speed adjustment and a wiper operation are performed using a single switch. More specifically, instead of the first annular switch Sw1 and second annular switch Sw2 according to the embodiment, wiper speed adjustment and a wiper operation are performed using a fourth annular switch Sw4 such as that shown in FIG. 21, which includes the functions of both the first annular switch Sw1 and the second annular switch Sw2.

Figure 21:
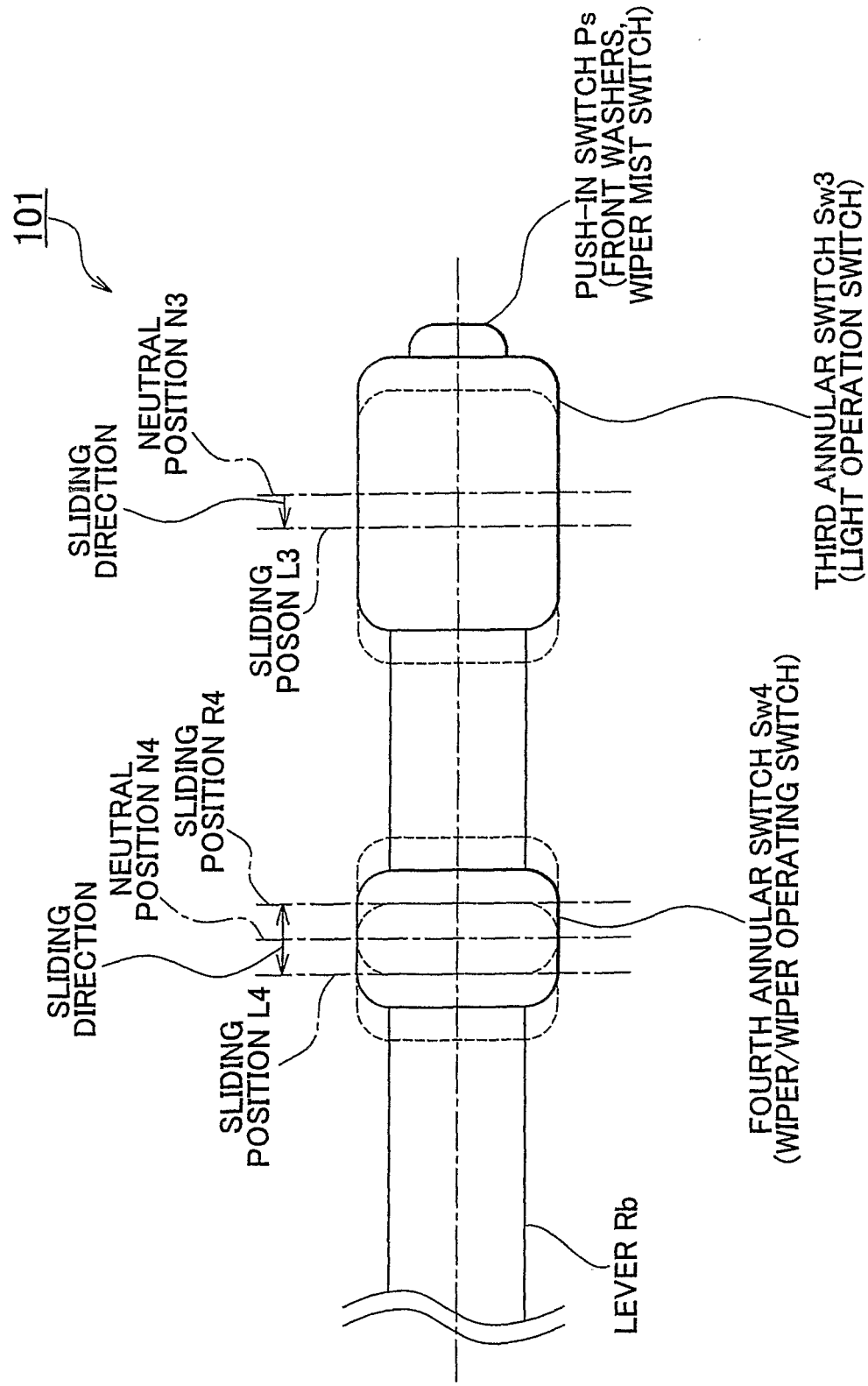
FIG. 21 is a view showing the schematic constitution of an operating unit according to a second modified example of the embodiment.

The fourth annular switch Sw4 shown in FIG. 21 is a touch sensor that switches On upon detection of contact and switches Off when contact is not detected, similarly to the second annular switch Sw2 described above. In the second modified example, the wiper/wiper speed operation screen is displayed on the display screen of the display unit 104 when the fourth annular switch Sw4 detects contact.

As shown in FIG. 21, the fourth annular switch Sw4 is attached to the lever Rb to be capable of rotating about the axis of the lever Rb, similarly to the other annular switches. Further, the fourth annular switch Sw4 is attached to be capable of sliding from a neutral position N4 to sliding positions L4 and R4, similarly to the second annular switch Sw2.

The operation subjects selected by sliding the fourth annular switch Sw4 to the respective positions shown in FIG. 21 are similar to those of the second annular switch Sw2 according to the embodiment. Further, the fourth annular switch Sw4 functions as a momentary switch in the respective positions shown in FIG. 21, similarly to the second annular switch Sw2.

The fourth annular switch Sw4 according to the second modified example functions as a momentary switch in the neutral position N4 and the sliding positions L4 and R4 shown in FIG. 21. Further, when rotated forward and rearward in the neutral position N4 and the sliding positions L4 and R4, the fourth annular switch Sw4 generates a forward rotation signal Fr4 and a rearward rotation signal Rr4, similarly to the second annular switch Sw2.

Figure 22:
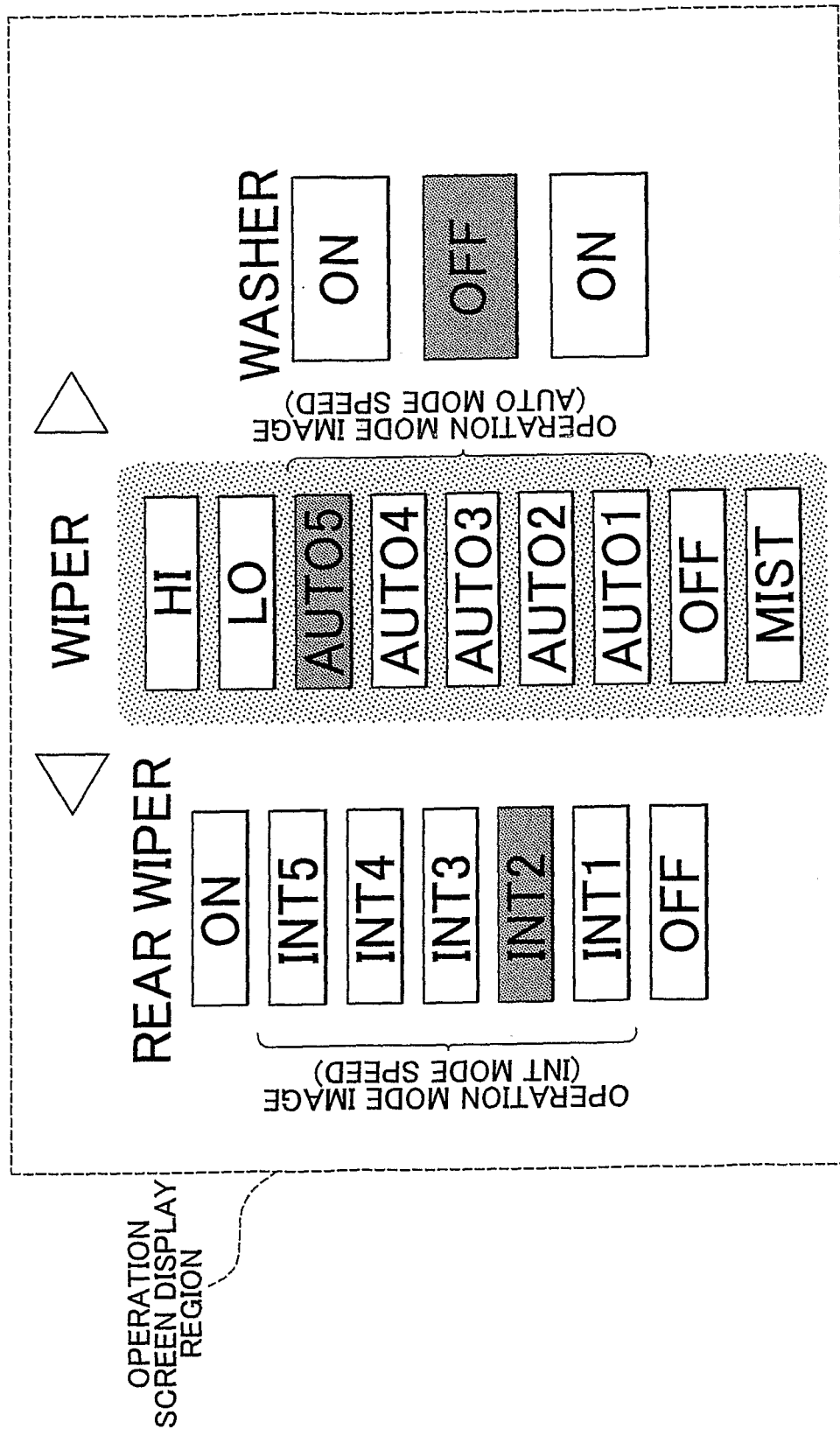
FIG. 22 is a view showing an example of a wiper/wiper speed operation screen according to the second modified example of the embodiment.

Next, the aforementioned wiper/wiper speed operation screen according to the second modified example will be described. FIG. 22 is a view showing an example of the wiper/wiper speed operation screen displayed on the display screen of the display unit 104 in the second modified example when the fourth annular switch Sw4 detects contact. The wiper/wiper speed operation screen according to the second modified example is formed such that the respective operation modes of the front wiper and the rear wiper and the respective operation speeds of the front wiper in the AUTO mode and the rear wiper in the intermittent mode (INT mode) can be operated using the single fourth annular switch Sw4. In other words, the wiper/wiper speed operation screen according to the second modified example is formed by adding operation mode images corresponding to operation modes AUTO1 to AUTO5, which serve as the operation mode images of the wiper, and operation mode images corresponding to operation modes INT1 to INT5, which serve as the operation mode images of the rear wiper, to the wiper operation screen shown in FIG. 7. Thus, the operating device 10 according to the second modified example can switch the wiper operation mode and adjust the wiper speed using the fourth annular switch Sw4 alone.

Next, the storage unit 103 according to the second modified example will be described. As described above, the AUTO1 to AUTO5 operation modes and the INT1 to INT5 operation modes are added as wiper operation modes and rear wiper operation modes, respectively, and therefore the storage table stored in the storage unit 103 must also be modified. FIG. 23 is a view showing the constitution of the storage table stored in the storage unit 103 according to the second modified example. When operation modes are added to the operation subjects, as in the second modified example, the wiper device 105 can be operated by the operating unit 101 in a similar manner to the embodiment by adding to the groups of operation modes and values stored in the storage table, as shown in FIG. 23.

Likewise in the second modified example, the operation mode images of each operation subject are displayed on the display screen of the display unit 104 according to this embodiment in rows forming the respective operation mode image rows, and the operation subject images representing, in alphabetic characters, the operation subjects corresponding to the respective operation mode image rows are displayed above the operation mode image rows on the display screen of the display unit 104, as described above. The second modified example is also similar to the embodiment in that the operation mode image row of the currently selected operation subject is highlighted, the operation mode image corresponding to the currently selected operation mode is highlighted in relation to the respective operation subjects, the respective sliding positions of the annular switches are associated with the positions of the operation mode image rows for each operation subject on the display screen of the display unit 104, the respective rotation directions of the annular switches are associated with the selection directions of the operation mode images for each operation subject on the display screen of the display unit 104, the sliding direction image is displayed, and where necessary, the sliding direction images are displayed continuously. Moreover, the third annular switch Sw3 of the second modified example has an identical constitution and identical functions to its counterpart in the embodiment, and hence description thereof has been omitted.

Figure 24:
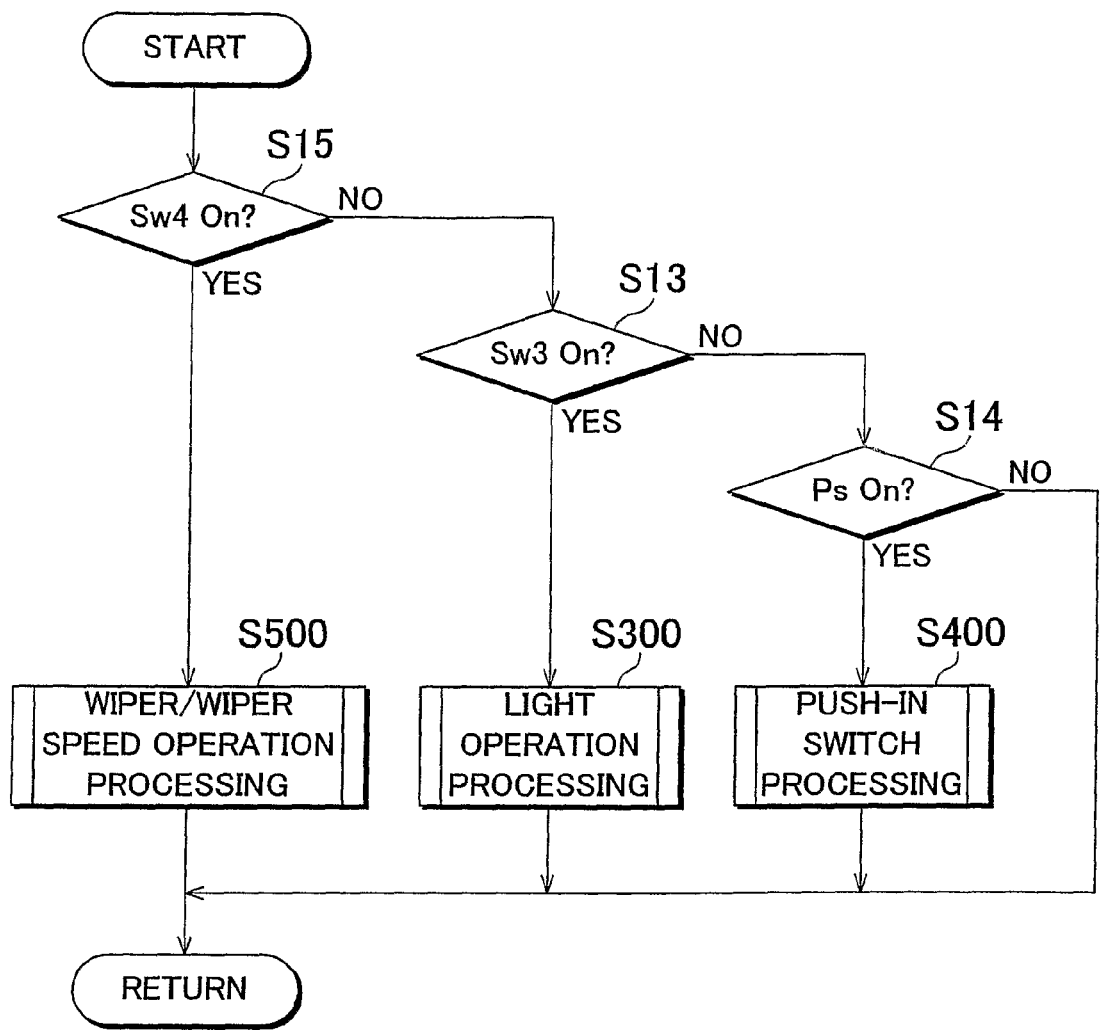
FIG. 24 is a view showing processing of a control unit according to the second modified example of the embodiment.

Next, referring to a flowchart, the processing of the control unit 102 in the second modified example will be described. FIG. 24 is a flowchart showing the processing of the control unit 102 in the second modified example, which is modified from the processing of the control unit 102 according to the embodiment, shown in the flowchart of FIG. 11. Note that in the processing of the control unit 102 according to the second modified example, identical reference symbols have been allocated to processing which is identical to that of the embodiment, and description thereof has been omitted. Further, the processing performed when the third annular switch Sw3 detects contact, or in other words the light operation processing, is identical to that of the embodiment, and hence description thereof has been omitted.

In a step S15, the control unit 102 determines whether or not the fourth annular switch Sw4 has switched On after detecting contact. When the control unit 102 determines in the step S15 that the fourth annular switch Sw4 has switched On after detecting contact, the processing advances to a step S500. When, on the other hand, the control unit 102 determines in the step S15 that the fourth annular switch Sw4 has not switched On, the processing advances to the step S13.

In the step S500, the control unit 102 begins wiper/wiper speed operation processing. The wiper/wiper speed operation processing will be described in detail below. When the control unit 102 completes the wiper/wiper speed operation processing of the step S500, the processing shown in FIG. 24 is repeated from the step S15.

Next, the wiper/wiper speed operation processing performed by the control unit 102 in the step S500 will be described. The processing performed by the control unit 102 in the step S500 is basically identical to the processing of the step S200. The specific differences between the step S500 and the step S200 are that the processing of the step S500 is performed on the basis of a signal generated by the fourth annular switch Sw4, a different storage table is referred to during the processing of the step S500, and the upper limit values (the comparison values of the steps S210 and S242) and lower limit values (the comparison values of the steps S214 and S247) of the front wiper mode value Wi and the rear wiper mode value Rw are different. Accordingly, detailed description of the step S500 has been omitted.

This completes the description of the processing performed by the control unit 102 in the second modified example. According to the second modified example, an operation in the wiper operation mode and a wiper speed adjustment operation can be performed by a single annular switch.

As shown in FIG. 25, a momentary turn switch Tw may be added. FIG. 25 is a view showing an example of a constitution in which the turn switch Tw is added to the operating unit 101 according to the second modified example described above. In the example shown in FIG. 25, a right turn signal can be issued by rotating the turn switch Tw in an upward direction about a central point b, and a left turn signal can be issued by rotating the turn switch Tw in a downward direction about the central point b.

In the embodiment and modified examples described above, it is assumed that the annular switch functions as a momentary switch in all sliding positions. However, the annular switch may be switched between a dial switch function and a momentary switch function when slid to the respective sliding positions. A dial switch is a switch that generates different signals according to an absolute position thereof in a rotation direction. When a dial switch is employed, a pushing force in a diametrical direction is detected, and when the pushing force is smaller than a predetermined value, it may be determined that contact with the annular switch has ceased. Further, when the detected diametrical direction pushing force reaches or exceeds the predetermined value, a signal corresponding to the absolute position in the rotation direction may be transmitted to the operation subject. When a dial switch is employed and the respective operation modes described above are pre-associated with absolute positions in the rotation direction, the operation mode desired by the user can be selected directly through a single rotation operation even in the case of an operation mode that can only be selected by rotating a momentary switch a plurality of times in the same direction. More specifically, when operating an operation subject having a large number of selectable operation modes (for example, the front wiper shown in FIG. 22), for example, the number of rotations of the momentary switch increases while attempting to select these operation modes using the momentary switch. In contrast, when the dial switch is used to operate an operation subject having a large number of selectable operation modes, the desired operation mode can be selected through a single rotation operation.

Further, in the embodiment and modified examples described above, the annular switch is described as being rotatable and slidable about the lever Rb. However, the annular switch of the operating unit 101 may be constituted to be capable of performing only one movement, i.e. either sliding or rotation, and the operation mode images and operation mode image rows may be disposed on the respective operation screens in such a manner that all of the operation subjects can be operated using the operating unit 101 thus constituted.

Further, all of the processing of the control unit 102 described above is merely an example, and the operating unit described above may be used to perform any processing that enables display of the display screen by the display unit and operation of the operation subjects.

Further, in the embodiment and modified examples described above, the operation subjects of each operable in-vehicle device are respectively associated with the annular switches, and the operation subjects of each in-vehicle device can be switched by sliding the respective annular switches. However, depending on the requirements of the user and designer, the operation subjects of a plurality of in-vehicle devices, rather than the operation subjects of each in-vehicle device, may be pre-associated with a single annular switch. More specifically, for example, the front wiper included in the wiper device and the fog lamp included in the light device may be pre-associated with a single annular switch such that by sliding the annular switch, these operation subjects (the front wiper and fog lamp) can be selected in accordance with the position of the annular switch following sliding. Thus, the freedom of association between the operation subjects and annular switches can be improved, whereby an operating environment considered better by the designer or more favorable to the user can be provided.

Further, in the embodiment and modified examples described above, each individual user may modify the display positions of the operation mode images displayed on the display screen of the display unit. In so doing, an operating environment reflecting the preferences of the user can be provided. Note, however, that even if the display positions of the operation mode images displayed on the display screen of the display unit are modified, the associations between the rotation directions of the annular switches and the selection directions of the operation mode images are preferably not modified.

Further, in the embodiment and modified examples described above, an operating device for an in-vehicle device was described. However, the operating device according to the present invention is not limited to an operating device for operating an in-vehicle device, and may be used as an operating device for operating any type of device that may be operated favorably using the operating device according to the present invention.

Furthermore, in the embodiment and modified examples described above, all of the annular switches are constituted such that an operation subject is selected when the annular switch is slid and a function of the selected operation subject is selected when the annular switch is rotated. However, the present invention may be constituted such that an operation subject is selected when the annular switch is rotated and a function of the selected operation subject is selected when the annular switch is slid. In this case, a row of operation mode images disposed in the horizontal direction of the display screen is displayed on the display screen of the display unit 104 as the operation mode image row. Further, display may be performed on the display screen of the display unit 104 such that the sliding position of the annular switch is associated with the display position of the operation mode images of each operation subject and the rotation direction of the annular switch is associated with the display position of the operation mode image row of each operation subject.

According to the present invention, a large number of functions can be operated easily without directly viewing an operating unit, and therefore the present invention may be used in an operation device for a device installed in a moving body such as a vehicle, for example.

The invention claimed is:

1. An operating device comprising:
an annular switch attached to an outer peripheral surface of a substantially rod-shaped operating lever so as to be capable of performing a reciprocating motion in a certain fixed direction along the outer peripheral surface of the operating lever;
a contact/non-contact detection device that detects contact and non-contact states in relation to the annular switch;
a display device that displays a plurality of functions of a specific operation subject pre-associated with the annular switch in a single row extending in a direction corresponding to the direction of the reciprocating motion of the annular switch when the contact/non-contact detection device detects the contact state in relation to the annular switch;
a function selection device that selects one function from the plurality of functions displayed in the single row by the display device in accordance with a position of the reciprocating motion of the annular switch in the certain fixed direction when the contact/non-contact detection device detects the contact state in relation to the annular switch; and
an execution instruction device that issues an instruction to the corresponding operation subject to execute the function selected by the function selection device at a point in time when the contact/non-contact detection device detects that the annular switch has shifted from the contact state to the non-contact state.

2. The operating device according to claim 1, wherein the annular switch is capable of rotating in a circumferential direction of the operating lever as the reciprocating motion in the certain fixed direction.

3. The operating device according to claim 1, wherein the annular switch is capable of sliding in a lengthwise direction of the operating lever as the reciprocating motion in the certain fixed direction.

4. The operating device according to claim 1, further comprising a function highlighting device for causing the display means to highlight the function selected by the function selection device.

5. The operating device according to claim 1, wherein the display device displays a display image indicating the number of operations of the annular switch required to select the operation subject.

6. The operating device according to claim 1, further comprising an elastic body for applying an urging force to the annular switch from one direction of the reciprocating motion.

7. The operating device according to claim 1, further comprising:
- a measuring device that measures a continuous operation time of the annular switch; and
- a determining device that determines that the annular switch is operative when the measured continuous operation time reaches or exceeds a predetermined time.

8. The operating device according to claim 1, wherein the operating device is installed in a vehicle.

9. The operating device according to claim 1, wherein the operation subject includes a light device and a wiper device.

10. An operating device comprising:
- an annular switch attached to an outer peripheral surface of a substantially rod-shaped operating lever so as to be capable of rotating in a circumferential direction of the operating lever and sliding in a lengthwise direction of the operating lever;
- a contact/non-contact detection device that detects contact and non-contact states in relation to the annular switch;
- a display device that displays a plurality of functions of an operation subject pre-associated with the annular switch in a single row extending in a direction corresponding to a rotation direction when the contact/non-contact detection device detects the contact state in relation to the annular switch;
- a display switching device that selectively switches a function group of the operation subject displayed by the display device to a function group of an operation subject corresponding to a sliding position of the annular switch when the contact/non-contact detection device detects the contact state in relation to the annular switch;
- a function selection device that selects one function from the plurality of functions displayed in the single row by the display device in accordance with a rotation position of the annular switch when the contact/non-contact detection device detects the contact state in relation to the annular switch; and
- an execution instruction device that issues an instruction to the corresponding operation subject to execute the function selected by the function selection device at a point in time when the contact/non-contact detection device shifts from the contact state to the non-contact state.

11. The operating device according to claim 10, wherein a plurality of operation subjects are associated with the annular switch in accordance with the sliding position thereof,
- the display device displays the function groups of all of the operation subjects associated with the annular switch at once in a plurality of rows, and
- the display switching device switches a display state of the display device such that the function group of an operation subject corresponding to the sliding position of the annular switch is highlighted.

12. The operating device according to claim 10, wherein a plurality of operation subjects are associated with the annular switch in accordance with the sliding position thereof, and the display device switches a display state such that only the function group of an operation subject corresponding to the sliding position of the annular switch is displayed.

13. The operating device according to claim 10, further comprising a function highlighting device for causing the display device to highlight the function selected by the function selection device.

14. The operating device according to claim 10, further comprising a guidance image display device that causes the display device to display an image for providing guidance relating to an operation state of the annular switch.

15. The operating device according to claim 10, further comprising a plurality of annular switches, wherein
- a different operation subject is associated with each of the annular switches.

16. The operating device according to claim 10, wherein the display device displays the respective function groups of each operation subject in single rows.

17. The operating device according to claim 10, wherein the display device displays a display image indicating the number of operations of the annular switch required to select the operation subject.

18. The operating device according to claim 10, further comprising an elastic body for applying an urging force to the annular switch from one direction.

19. The operating device according to claim 10, further comprising:
- a measuring device that measures a continuous operation time of the annular switch; and
- a determining device that determines that the annular switch is operative when the measured continuous operation time reaches or exceeds a predetermined time.

20. The operating device according to claim 10, wherein the operating device is installed in a vehicle.

21. An operating device comprising:
- an annular switch attached to an outer peripheral surface of a substantially rod-shaped operating lever so as to be capable of rotating in a circumferential direction of the operating lever and sliding in a lengthwise direction of the operating lever;
- a contact/non-contact detection device that detects contact and non-contact states in relation to the annular switch;
- a display device that displays a plurality of functions of an operation subject pre-associated with the annular switch in a single row extending in a direction corresponding to the sliding direction when the contact/non-contact detection device detects the contact state in relation to the annular switch;
- a display switching device that selectively switches a function group of the operation subject displayed by the display device to a function group of an operation subject corresponding to a rotation position of the annular switch when the contact/non-contact detection device detects the contact state in relation to the annular switch;
- a function selection device that selects one function from the plurality of functions displayed in the single row by the display device in accordance with a sliding position of the annular switch when the contact/non-contact detection device detects the contact state in relation to the annular switch; and
- an execution instruction device that issues an instruction to the corresponding operation subject to execute the function selected by the function selection device at a point in time when the contact/non-contact detection device shifts from the contact state to the non-contact state.

22. The operating device according to claim 21, wherein a plurality of operation subjects are associated with the annular switch in accordance with the rotation position thereof, the display device displays the function groups of all of the operation subjects associated with the annular switch at once in a plurality of rows, and the display switching device switches a display state of the display device such that the function group of an operation subject corresponding to the rotation position of the annular switch is highlighted.

23. The operating device according to claim 21, wherein a plurality of operation subjects are associated with the annular switch in accordance with the rotation position thereof, and the display device switches a display state such that only the function group of an operation subject corresponding to the rotation position of the annular switch is displayed.

24. The operating device according to claim 21, further comprising a function highlighting device that causes the display device to highlight the function selected by the function selection device.

25. The operating device according to claim 21, further comprising a guidance image display device that causes the display device to display an image for providing guidance relating to an operation state of the annular switch.

26. The operating device according to claim 21, further comprising a plurality of annular switches wherein a different operation subject is associated with each of the annular switches.

27. The operating device according to claim 21, wherein the display device displays the respective function groups of each operation subject in single rows.

28. The operating device according to claim 21, wherein the display device displays a display image indicating the number of operations of the annular switch required to select the operation subject.

29. The operating device according to claim 21, further comprising an elastic body for applying an urging force to the annular switch from one direction.

30. The operating device according to claim 21, further comprising:
  a measuring device that measures a continuous operation time of the annular switch; and
  a determining device that determines that the annular switch is operative when the measured continuous operation time reaches or exceeds a predetermined time.

31. The operating device according to claim 21, wherein the operating device is installed in a vehicle.

* * * * *